(12) United States Patent
Guthrie et al.

(10) Patent No.: US 11,169,050 B1
(45) Date of Patent: Nov. 9, 2021

(54) MULTIPLE ENERGIC PENETRATION AND DAMAGE PROGRESSION SENSOR IMPROVEMENTS

(71) Applicant: FreEnt Technologies Inc., Huntsville, AL (US)

(72) Inventors: Michael J. Guthrie, Huntsville, AL (US); Herbert U. Fluhler, Huntsville, AL (US); Michael C. Zari, Madison, AL (US)

(73) Assignee: FreEnt Technologies, Inc., Huntsville, AL (US)

( * ) Notice: Subject to any disclaimer, the term of this patent is extended or adjusted under 35 U.S.C. 154(b) by 0 days.

(21) Appl. No.: 15/607,663

(22) Filed: May 29, 2017

Related U.S. Application Data

(63) Continuation-in-part of application No. 14/664,638, filed on Mar. 20, 2015, now Pat. No. 9,709,459.

(51) Int. Cl.
*G01M 11/08* (2006.01)
*G01M 5/00* (2006.01)

(52) U.S. Cl.
CPC ........ *G01M 11/085* (2013.01); *G01M 5/0033* (2013.01); *G01M 5/0091* (2013.01)

(58) Field of Classification Search
CPC . F41H 1/02; G01D 5/353; G01D 5/26; G01D 5/268; G01N 3/30; G01N 3/313; G01L 1/24; G01L 1/242; G01L 1/243; G01L 1/245; G01L 5/0052; G01M 11/085; G01M 5/0033; G01M 5/0091; F41J 5/04; F41J 5/044; F41J 5/048; F41J 5/02; F41J 5/06; F41J 5/00; G01V 8/16; G01V 8/24; G01B 7/004; G01B 11/18
See application file for complete search history.

(56) References Cited

U.S. PATENT DOCUMENTS

| | | | |
|---|---|---|---|
| 4,517,456 A * | 5/1985 | Halsall | H04J 14/02 250/226 |
| 5,013,908 A * | 5/1991 | Chang | G01M 11/083 250/227.15 |
| 6,841,766 B2 | 1/2005 | Gauthier, Jr. et al. | |
| 6,931,166 B2 | 8/2005 | Gauthier, Jr. et al. | |
| 7,156,559 B2 | 1/2007 | Gauthier, Jr. et al. | |
| 7,189,959 B1 * | 3/2007 | Morison | G01L 5/0052 250/227.14 |
| 7,197,197 B2 | 3/2007 | Gauthier, Jr. et al. | |
| 7,406,219 B2 | 7/2008 | Gauthier, Jr. | |
| 7,435,010 B2 | 10/2008 | Gauthier, Jr. et al. | |

(Continued)

*Primary Examiner* — Jennifer D Bennett
(74) *Attorney, Agent, or Firm* — Patent Grove LLC; Tomas Friend

(57) ABSTRACT

Apparatus for detecting high speed hits on a target is disclosed. A first set of detection lines are would in one direction around a target, and a second set of detection lines is wound orthogonal or diagonal to the first set of lines around a target. Where the detection lines are light-transmissive fibers, cutting of a fiber by a high-speed projectile or fragment causes a flash of photons that are detected by a detector attached to that line. Materials the lines are embedded in may also cause bursts of photons when pierced that is detected by detectors. The lines may be laid in prefabricated panels, or attached to an exterior or interior skin of a target. Moldings may be used to ensure that a bend radius of the light-transmissive fibers is not exceeded.

9 Claims, 18 Drawing Sheets

(56) References Cited

U.S. PATENT DOCUMENTS

| | | | | |
|---|---|---|---|---|
| 8,149,394 | B2* | 4/2012 | Burchardt | G01M 5/0016 |
| | | | | 356/237.1 |
| 9,709,459 | B1* | 7/2017 | Guthrie | G01M 11/085 |
| 2007/0112515 | A1* | 5/2007 | Gauthier, Jr. | G01D 5/26 |
| | | | | 701/301 |
| 2012/0188078 | A1* | 7/2012 | Soles | G08B 13/126 |
| | | | | 340/540 |
| 2014/0214282 | A1* | 7/2014 | Lee | B60R 21/0136 |
| | | | | 701/45 |

* cited by examiner

OUTSIDE OF CONE TARGET

CONE TARGET STRUCTURE

CONE TARGET TOP

CONE TARGET SIDE

MOLDING CROSS SECTION

MOLDING INSIDE LOOKING OUT

OUTER SIDE VIEW

INNER SIDE VIEW

TOP OUTER VIEW

INSTALLED

MULTIPLE ENERGIC PENETRATION AND DAMAGE PROGRESSION SENSOR IMPROVEMENTS

CROSS REFERENCE TO RELATED APPLICATION

This application is a Continuation In Part (CIP) of Applicants pending U.S. patent application Ser. No. 14/664,638, filed Mar. 20, 2015, which is incorporated herein in its entirety by reference.

STATEMENT REGARDING FEDERALLY FUNDED DEVELOPMENT

Adaptation and application to specific defense related uses was funded by the Missile Defense Agency under SBIR Topic MDA13-015: Advanced Hit Detection Systems Contract Number: HQ0147-14-C-7830. The government has certain rights in this invention.

FIELD OF THE INVENTION

This invention relates generally to sensors for detecting high speed collisions, and particularly to a sensor comprising a passive 2-Dimensional or 3-Dimensional grid of sensing lines for detecting initial and subsequent points of energetic projectile impactor penetration and damage progression due to multiple energetic penetrations of a surface or volume. Improvements are also disclosed for detecting coverage of projectile impacts, means for mechanically mounting the sensing lines and means for measuring velocity of the impacting projectiles. Other phenomenologies to sense location and timing of energetic impacts, or less energetic contacts and velocities may be used.

BACKGROUND OF THE INVENTION

In aerospace, defense, energy production, and energetic materials applications it is often of interest to measure the precise location of energetic penetration or rupture of a surface or volume of interest. It is also of interest to characterize the impact if possible. In these and other applications it is also often of interest to measure a precise location and potentially also velocity of contact between one or more moving bodies. It is also often of interest to detect, discern and measure the precise location and potentially also velocity of multiple contacts and penetrations as the contacting moving bodies disassemble from the energetic collisions. Finally it is also of interest to be able to record the progression of sound waves and shock waves through materials with minimal perturbation of the propagation medium (e.g., liquid or solid explosive).

This invention has application to any field that requires local damage site characterization from energetic impacts, fire or high-temperature failure modes, explosive devices, munitions development, structure blast survivability studies, energetic propellant characterization, or surface damage due to extreme environments, such as occur in a detonation of an explosive or with space vehicles re-entering the Earth's atmosphere. In this regard, the invention can be employed to measure propagation of a detonation shock wave inside an explosive. Other applications include aircraft and building fire detection, rocket booster burn rate and/or failure detection, and combat vehicle damage detection, location, and notification. Satellite and space station damage and damage prediction due to meteorite impacts is another application. For lower energetic encounters, an adaptation employing different low energy sensing modalities can enable non-destructive contact sensing from strain induced sensing modalities as opposed to impact or penetration sensing.

U.S. Government agencies, such as the Missile Defense Agency (MDA), have interests in such technology in the field of missile defense where it is desired to destroy incoming enemy missiles. It is important to know an impact point or multiple impact points that may occur in an interceptor engagement as well as progression of resulting damage through a particular target of interest. Tactical weapon lethality testing of the U.S. Army, Air Force, and Navy also requires knowledge of a hit-point on a particular target such as an armored vehicle, aircraft, ship, submarine, or bunker. Additionally, the National Aeronautics and Space Administration (NASA) has interest in damage assessment due to high-velocity impacts of debris and meteorites on space vehicles, as well as a desire to detect and locate potential burn-through and catastrophic failure of rocket boosters. A rate at which such phenomena occur and/or velocity of projectiles is also of significant interest.

There are existing hit-point electrical and optical sensor systems that can either detect or estimate location of an energetic penetration of surfaces. Electrical systems include conventional electrical break-wire grids and similar approaches, such as a Coaxial Hit Grid (CHG) developed by Battelle Corporation. The CHG uses a grid of coaxial cables instead of a simple break-wire grid to estimate impact location of a kinetic energy collision. It is important to note that both of these systems are "active" sensing systems, requiring an electrical or RF power source to power or energize discrete conductors of an unbroken grid so as to sense a broken grid upon cable or wire grid breakage from a penetration. A first drawback of using such electrical detection techniques is that they are more complex since an electrical or RF power source is required for each sensing line. A second drawback is that added complexity of these electrical or RF power sources reduces reliability of such a system since if an electrical power source is inoperable, so too are associated lines of the system. A third drawback of such systems is that during energetic events they often are disrupted by electromagnetic interference (EMI) that can cause corruption of data. Optical techniques have also been developed over the years to try to address at least some of these issues. Johns Hopkins University Applied Physics Laboratory (JHU APL) has developed several optical techniques including a Light-Speed Hitpoint Sensor (LSHS) that uses a similar fiber-optic light detection approach as the present invention. However, it is an active and more complex system incapable of making multiple hit-point detections because of the architecture employed, and its time of flight measurement can also be confused by multiple impact detections.

Another example of an optical system developed by JHU APL is a Blast Initiation Detector (BID) as disclosed in U.S. Pat. Nos. 6,841,766, 7,156,559, and 7,435,010. The BID detects time of a collision by viewing an exterior region to a surface of interest and can also detect a flash from a detonating fragmenting interceptor. The BID is a high-speed instrument that detects rapid onset optical events. It has a wide field-of-view and uses high-temperature optical fibers that maintain their field-of-view and optical throughput during rapid heating that occurs upon a vehicle reentry into the earth's atmosphere.

JHU APL also developed Planar Optical Penetration Sensors (POPS), as disclosed in U.S. Pat. Nos. 6,931,166 and 7,197,197. The POPS sensor element includes a sandwich of a transparent layer between two reflective layers, that in turn are between two opaque layers. An optical sensor structure comprising these layers includes a set of such sensor sheets positioned in respective planes of spacers and wedges wherein at least two non-parallel optical sensor sheets are used for each trajectory dimension of interest that differs from the primary direction of motion of a penetrating projectile. One additional optical sensor may be used for independent measurement of velocity attenuation.

Other fiber-optic based optical systems include ITT's Photonic Hit Indicator (PHI). PHI is an active fiber-optic grid that is designed to provide unique impact location indications for different flight test targets.

While these hit-point sensor systems accomplish their intended purpose of detecting or locating energetic impacts on a surface of interest, they are incapable of detecting multiple near simultaneous hit-points that would occur during chaotic explosive events or ultrafast contact between a projectile and target or the like. Additionally, with the exception of the POPS, they are all active systems, requiring a high intensity light source that presents an additional point of potential failure and lower reliability.

Another feature of these systems, when used in high-velocity impact and explosives testing, is that data must be retrieved and stored or transmitted in a very short time period over duration of an event. The particular amount of data to be stored or transmitted is limited by speed of preprocessing needed to reduce more complex raw data and bandwidth of data recording or telemetry system used. It is therefore desirable to minimize an amount of data collected, processed, and transmitted in order to support determination of location of multiple energetic penetrations of a surface or volume and subsequent progression of that penetration and damage in time.

The present invention is aimed at improving the sensor disclosed in Applicant; Applicants' patent application Ser. No. 14/664,638 to further enhance a capability of accurately locating and characterizing (via velocity) multiple energetic penetrations of a surface or volume and recording the progression of that penetration and/or subsequent damage in space and time, and to improve capability vis-a-vis velocity measurement. The disclosed techniques are also very data efficient and require only a minimal of data throughput to provide these features, and therefore inherently provide higher speed recording of events over that of currently available systems, almost assuredly with need for or benefit of data compression means.

DETAILED DESCRIPTION OF THE DRAWINGS

The purpose of the instant invention is to detect, count, locate, characterize (via size and velocity), telemeter and record one or more near simultaneous hit or contact indicating events with sufficiently high kinematic energy to register in the invention. Another objective of the invention is to do this with a minimum of complexity, a low SWAP (Size, Weight and Power), a low cost, a low implementation impact with minimal spatial interference and robust, elegant and reliable operation. Another objective of the invention is provide the acquired hit detection information in a most compact form that requires little to no information deterioration from data compression, thereby both simplifying overall system design while maximizing the amount of data from the event before telemetry demise.

Figure 1:
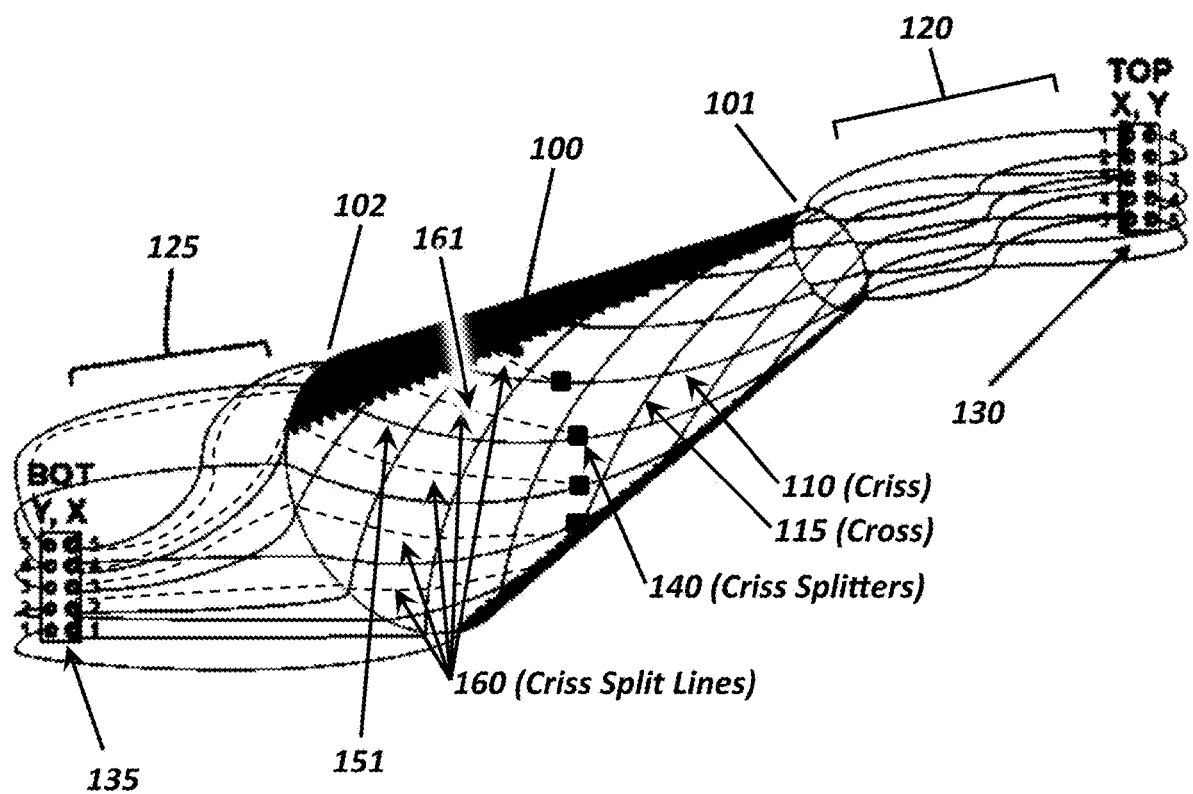
FIG. 1 is a diagrammatic view showing the main components of a first embodiment of the invention applied to a typical conical Reentry Vehicle target.

FIG. 1 shows how a 2-dimensional pseudo-curvilinear rectilinear grid can be wrapped about a target conical body of revolution to form a curvilinear pseudoorthogonal grid on the surface of said target, and how, through the addition of splitters at target mid-body and additional sensing lines running towards the base (larger diameter), spatial separation between lines can be retained in the larger gaps between the primary lines (lines that run all the way from the front to the rear of the conical target) towards the rear base of the target. Additionally, it shows how the signal receivers are connected and managed at the forward and aft positions on said target with more detectors and associated sensing lines near the rear bottom (larger diameter) of the conical target and fewer detectors and associated sensing lines near the top (smaller diameter) of the conical target.

While the sensing lines of Applicants' prior application Ser. No. 14/664,638 provide sensing of impacts, an improvement is disclosed in FIG. 1 of the instant application that provides better projectile impact area coverage. Here, a target 100, in this case a conical target, is covered with an array of "criss" optical lines 110 and "cross" optical lines 115. While shown on an exterior of target 100, lines 110 and 115 may be imbedded within a skin of a target, mounted to an inner surface of the skin of a target or to structural members adjacent an inner surface of the skin. Such mounting of optical fibers 110, 115 eliminates optical perturbations on the surface of the target that may disrupt observations from exogenous optical sensors that may be used during a test.

The Criss lines 110 and Cross optical lines 115 of the instant invention replace the optical lines 415 (also referred to as "sensing lines" to be more generic to all potential sensing phenomena) and 410 respectively of FIG. 4 of Applicants' application Ser. No. 14/664,638. As shown in FIG. 1, optical lines 110 spiral in one direction about target 100 and optical lines 115 spiral in an opposite direction about target 100. Additionally, these lines 110, 115 have optical splitters 140 (denoted by black squares) approximately half way down a longitudinal extent of conical target 100, thereby splitting discrete Criss Lines 110 that start near nose 101 of the cone into two or more branched Split Criss Lines 160 (denoted by dashed lines). These Criss and split Criss sensor lines are progressively wrapped around target 100 interstitial to neighbor Criss and split Criss sensor lines down toward the base 102 of the cone target, thereby never crossing each other. Likewise, the Cross lines are similarly split and wrapped towards the base 102. For clarity, the splitters (141) for the Cross Lines 115 and corresponding Split Cross Lines branches (165) are not shown in FIG. 1, but would be located at a substantially similar longitudinal positions on the target cone, and distributed circumferentially, but wrapped in opposite (mirror image) rotational sense from the Criss Lines and Split Criss Lines. Using this design approach, the projectile impact location accuracy is increased in the base region of the cone as compared to without the splitters and split Criss (or split Cross) lines. This retains impact location measurement accuracy for smaller projectiles along the entire body of the target. Significantly, additional area coverage of the target is provided.

It is noted that although only one set of splitting stages is shown, multiple splitting stages may be employed either in parallel or sequentially on the sensing lines to provide additional optical line coverage for higher resolution coverage as needed throughout the entire body of the conical target. In other words, the split optical lines may be split again where desired. Also, splitters may be employed that split one optical line into multiple lines. If employed on a multiple layer embodiment of the optical line grid, impact, penetration and velocity coverage would be likewise retained in the multiple layers of the cone target as well.

The number of splits will result in more lines 125 at base 102 of cone 100 which then also may need a commensurate number of detectors 135 to service them. In some instances, more than one optical line may be coupled to a single detector, such as where multiple lines in different layers of the target overlay each other. Where there is one detector per line, additional resilience to multiple impacts on the same optical line is provided. For example, if detectors 130 connected with lines 120 were not implemented due to other mission considerations, and if a projectile struck the optical line at 151 and severed that optical line, then in the embodiment without splitters and without detectors 130, all subsequent hits to the right of the hit in line 151 in FIG. 1 (i.e., approximately to the right of 140) would be subsequently undetectable. However, if splitter 140 is provided, then any projectile impacting above it (to the right of 140) can still be detected through the adjacent split optical line 161, even if detectors 130 are not provided in a specific design embodiment. If only detectors 130 and 135 are provided, then multiple hit robustness of at least 2 hits per fiber are provided. If splitter 140 (and 141) and split lines 160 (and 165) are provided, then 3 or more hits (depending on their location) are provided.

Thereby, the invention provides not only better closely spaced coverage of the lower portion of the cone 102, but also provides additional robustness to the detection of more projectiles hitting same optical lines. If this approach is taken to its conclusion, additional redundancy is provided as each stage of additional splitting is provided, while at the same time reducing the longitudinal length covered by each stage of splitting which thereby further localizes hits through longitudinal localization. For example, if a hit happens on a fiber in the upper section of the cone target 101, if one 2 way splitter is used as shown in FIG. 1, then two detectors will see it at 135 indicating that the hit was in the upper section of the cone 101, even if the orthogonal (of opposite wrap chirality) optical line channel normally employed for localization is already cut by a prior projectile. As should be apparent, such splitting of lines provides more coverage where a target is wider or larger at one portion, thus requiring more lines to provide the same coverage as at smaller or narrower regions of the target.

It is obvious that were the target not conical, then a different layout of the grid would be needed to provide the desired coverage, but this is easily accomplished by one of ordinary skill in the art of engineering, geometry and trigonometry. Such a layout will depend on the specific shape of the target body, but in most cases some type of orthogonal or pseudo-orthogonal Curvilinear Coordinate System will provide best or acceptable results, and the aforementioned splitters and attendant optical line branches will permit coverage and resolution in those sections of the grid where the coordinate system would otherwise degrade coverage and accuracy from larger spacing between lines.

Figure 2:
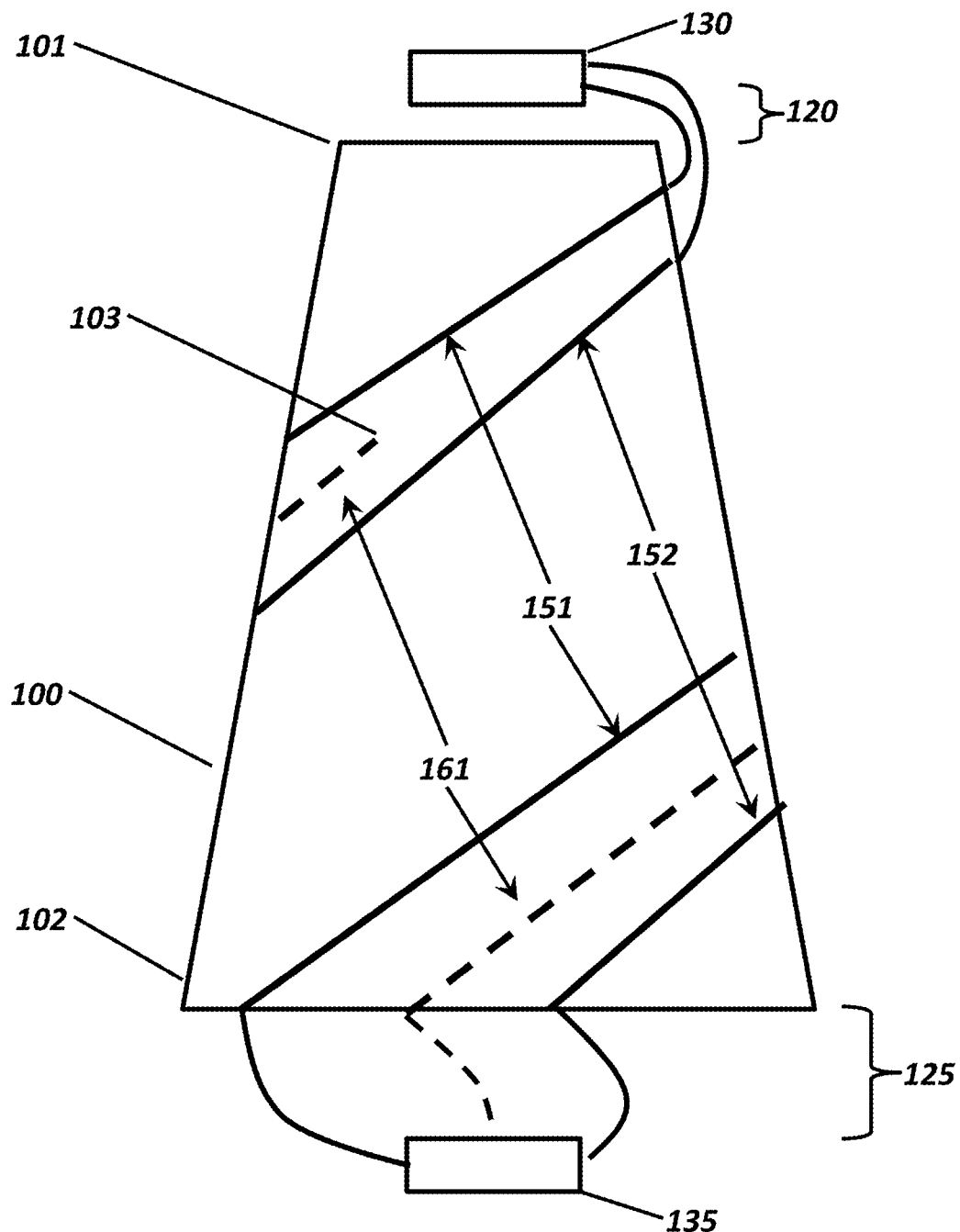
FIG. 2 is a diagrammatic view showing construction details of FIG. 1.

FIG. 2 is an alternate, more focused and detailed rendition of FIG. 1, showing only one pair, 151 and 152, of the many primary sensing lines wrapped around conical target 100 in one chirality, plus an additional but shorter interstitial sensing line 161 (without splitter 140) running between said primary lines from the base 102 to about half way up the conical target at 103 to fill in the wider space between primary lines 151 and 152 near the base of the target 102. The shorter optical line 161 is connected to its own detector channel in detector block 135. This arrangement has the advantage of providing both complete coverage of the base of the cone 102, as well as providing actual recordable improved resolution in the base because line 161 bisects the area between lines 151 and 152. This permits the spatial separation requirement to be enforced throughout the target surface coverage. A substantially identical arrangement is employed for the oppositely wrapped orthogonal or pseudo-orthogonal optical lines. The price of this scheme is the need for more detectors in the detector block 135 (a factor of two more detectors for FIG. 2).

Figure 3:
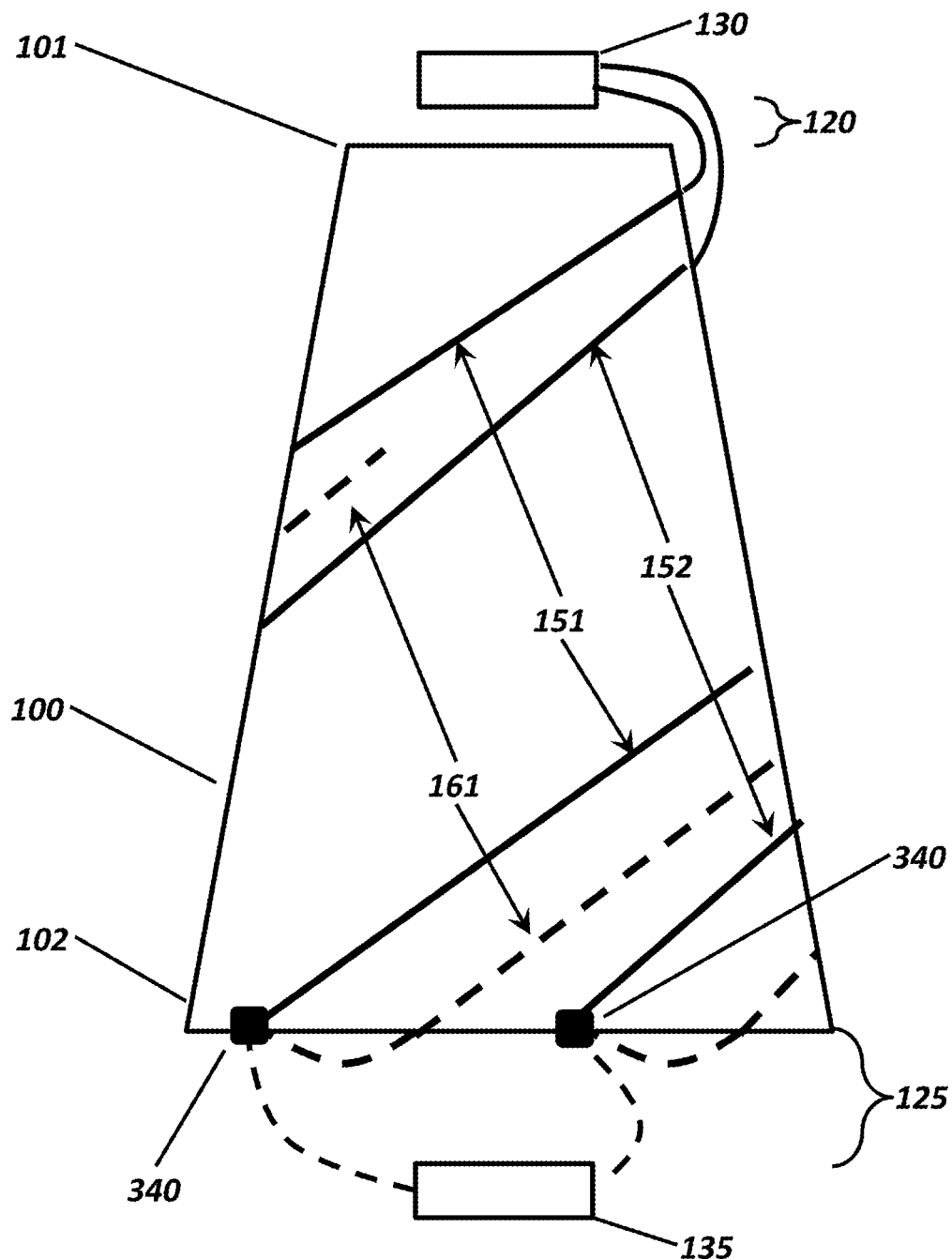
FIG. 3 is a diagrammatic illustration of an alternate embodiment of the invention.
Figure 4A:
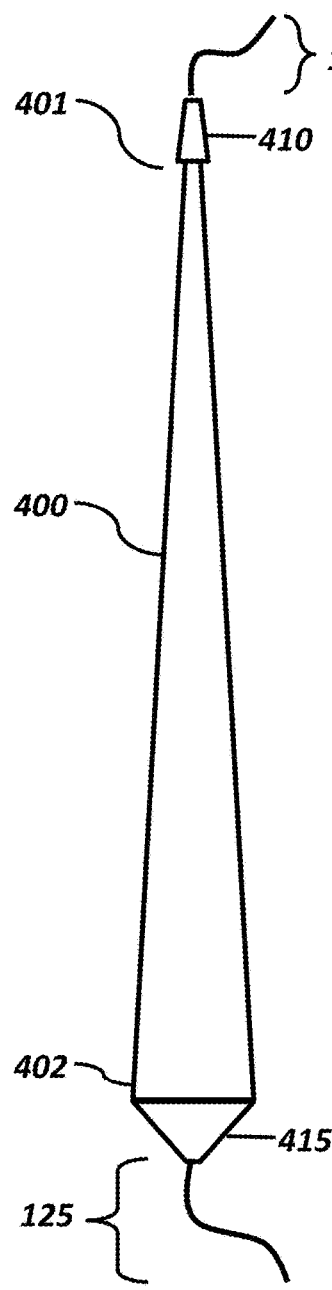
FIGS. 4A-4D are diagrammatic views showing alternate construction details of the detection sensor elements used in the invention.
Figure 4B:
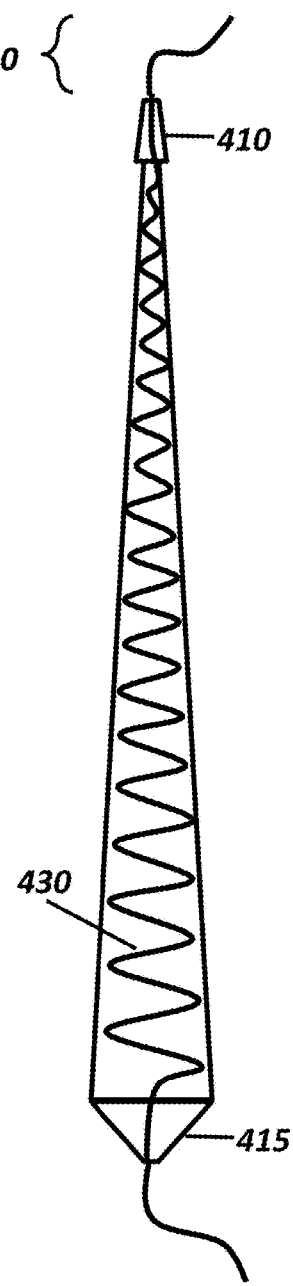
Figure 4C:
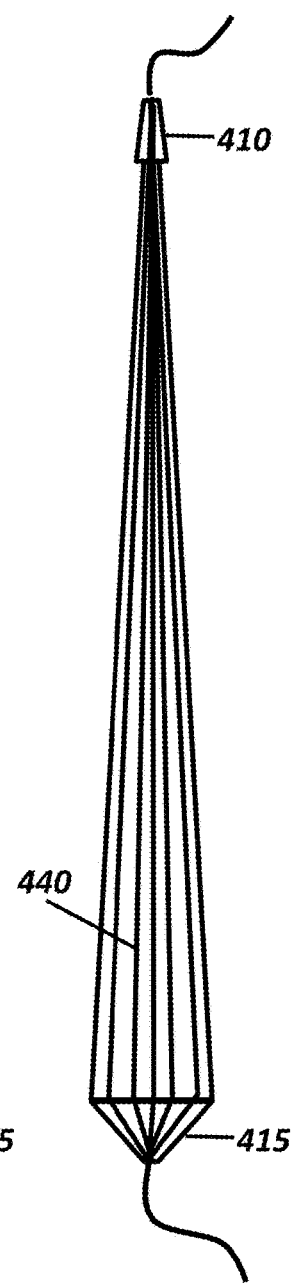
Figure 4D:
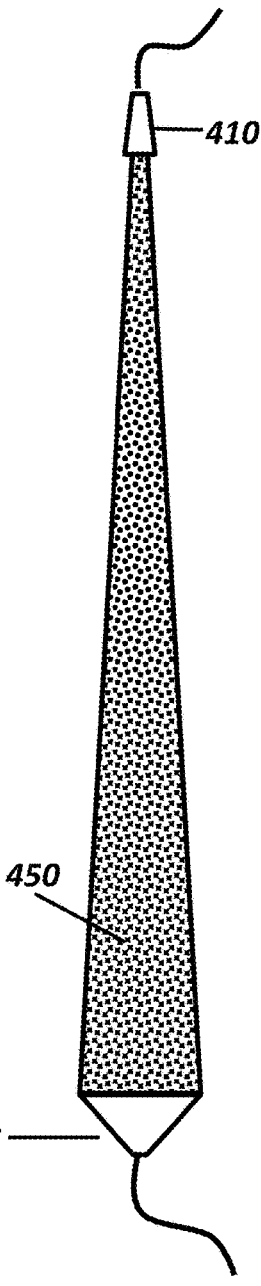

FIG. 3 shows a further embodiment wherein the splitters 140 of FIG. 1 and for counter wound lines, (not shown) are moved from mid body to a location 340 near base of cone target 102. This embodiment is likewise similar to FIGS. 1 and 2, providing full coverage (no gaps) from the nose to the base of the cone 100, but not requiring any more detectors than the embodiment shown in Figure FIG. 1 of Applicants' incorporated application. Note that because no more detectors are employed, this arrangement does not provide higher measurement resolution in the base of the cone, it only ensures that a projectile hit will not be missed because of the enlarging gap between optical lines as one move towards the base of the cone. Note also that this arrangement does not explicitly have any additional redundancy for multiple hits beyond that of Applicants' incorporated application like the embodiments of current FIGS. 1 and 2 had, with the possible addition of some redundancy were a hit to occur on one primary line (for example 151) but not break the adjacent secondary line 161, but then a second hit break 161 and 151 both. Therefore there is a limited amount of additional redundancy enabled by the embodiment in FIG. 3.

Figure 5:
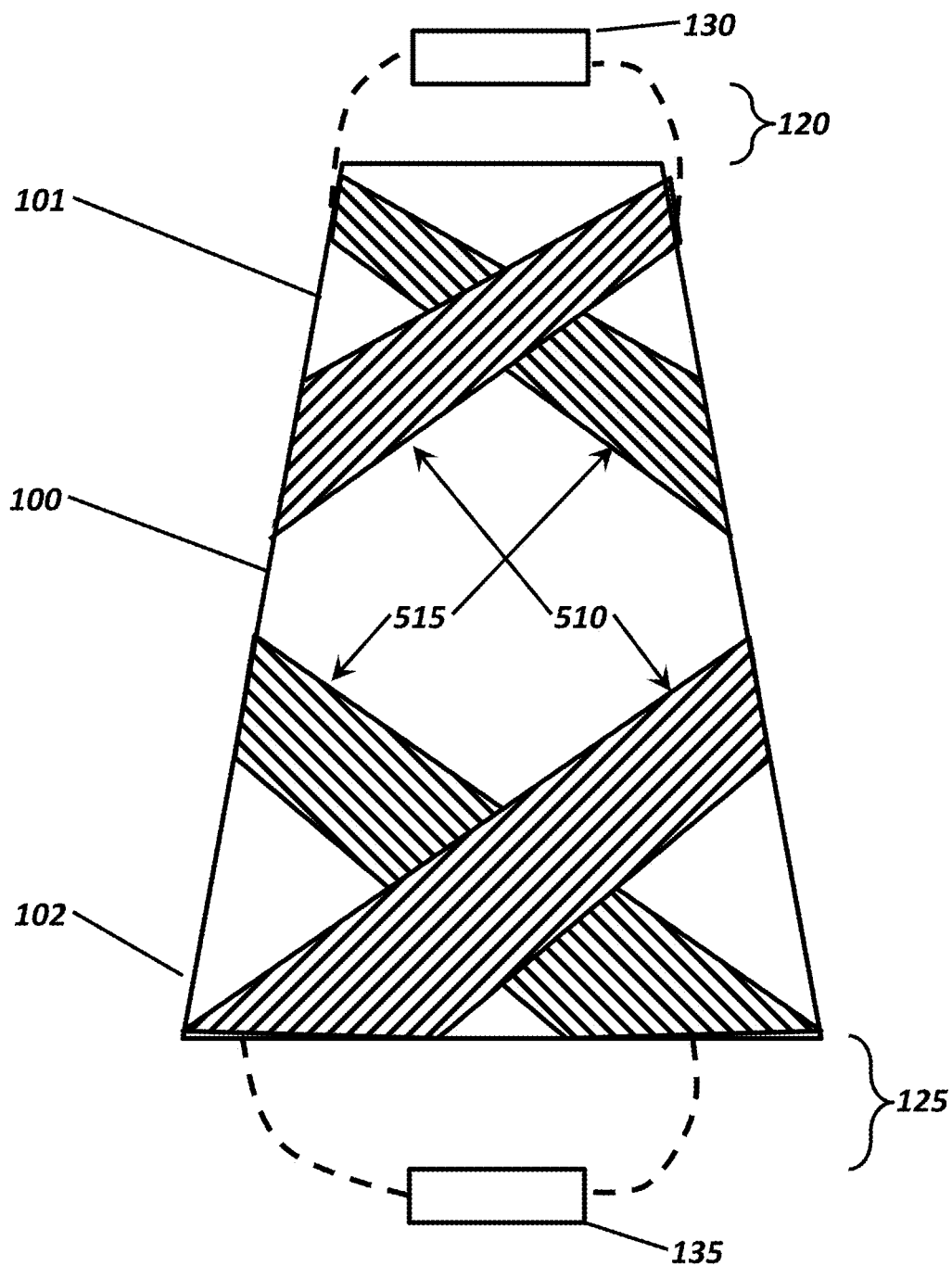
FIG. 5 is a diagrammatic view of construction details of one embodiment of the invention.
Figure 6A:
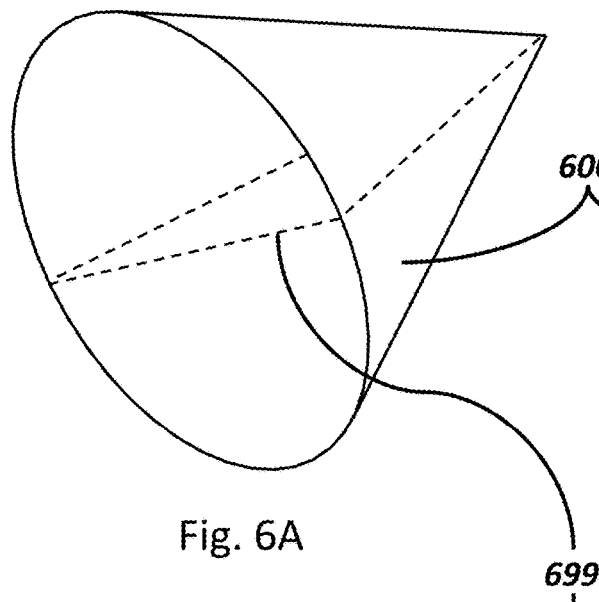
FIGS. 6A-6D is a diagrammatic view showing circumferential ribs inside a generic target shell/skin as possible mounting locations for the invention. It also shows Cut A through the longitudinal axis of the target illustrated further in FIG. 8.
Figure 6B:
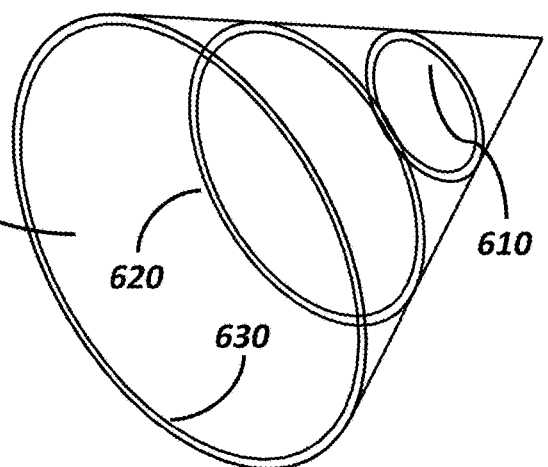
Figure 6C:
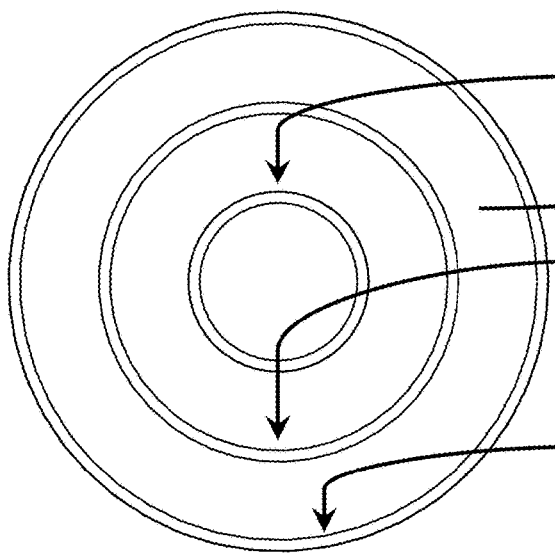
Figure 6D:
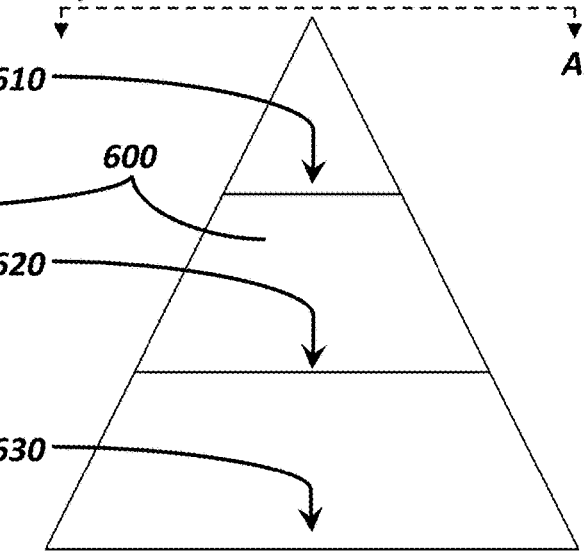

FIG. 5 shows a alternate embodiment employing a different type of sensing line, hereafter referred to as a Wide Optical Line (WOL), examples of which are shown in FIG. 4. Note that although the current and subsequent disclosure employs an optical line, the current invention is not restricted to optical lines and could for many applications use any projectile impact sensing phenomenology sensor, examples of which include piezoelectric, acoustic, radio frequency and electric break-wire sensor technologies.

The Wide Optical Line (WOL) of FIG. 4 is simply a wider type of optical waveguide than a conventional optical line or fiber, nominally a fiber bundle or other optical waveguide. The width is advantageous in the current application because it can cover more surface area or volume per channel, thereby helping to reduce the number of optical lines and associated channels needed to cover an area, as long as the width is not so wide as to degrade the projectile impact location accuracy capability relative to the accuracy requirements for the system. The WOL will also typically offer additional redundancy to detecting multiple impacting projectiles as long as the impacting projectiles are not so large as to sever the entire width of the WOL (assuming only one detector channel connected to the WOL).

For the cone target 100 of FIG. 5, several differently constructed WOLs are shown in FIG. 4. The WOL is typically constructed outwardly as a long fairly narrow triangular strip 400 with a Collector 415 connecting to one or more detectors 135 through lines 125 attached to or near the base 402 of the WOL triangle strip. Note that the detectors 135 could be individually attached to the apex of the WOL 415 with line 125 then comprising an electrical signal line instead of a fiber. However, this can defeat the purpose of using optical lines whereby electromagnetic interference from impacts might couple to electrical lines and cause noise and subsequent disruption of the measurements.

A second Collector 410 may optionally be connect to one or more lines 120 near at the apex 401 of the WOL triangular strip and fed to the detector box 130 servicing the nose region 101 of the cone target. The same discussion holds for moving detectors to the apex at 410 as held for the apex at 415 above. In this way detections can be optionally made from either end of the WOL even if it were entirely severed, which nominally should not happen since the WOL is typically designed wider than most anticipated projectiles.

Note that here the WOL is triangular shaped to accommodate the cone shape of the target to be instrumented. However, it should be apparent that different target shapes might dictate different WOL shapes for optimum coverage and accuracy. For example a cylindrical target would ideally employ long thin WOLs along the longitudinal dimension and ring shaped WOLs for the circumferential dimension. In general the WOL will have the shape of pseudo-parallel lines in the pseudo-curvilinear coordinate system best describing the target geometry and/or its subcomponents.

The WOL may comprise a closely spaced serpentine wrap 430 (FIG. 4B) of a single or multiple optic line(s) or fiber(s) to cover the area of the WOL triangular strip, or it may comprise a substantially collinear bundle of fiber optics 440 (FIG. 4C) all with a common collector at one or each end 410, 415 of the WOL, or it may comprise any other type of optical waveguide 450 such as the POPS detector element described in U.S. Pat. Nos. 6,931,166 and 7,197,197.

In any case, the WOLs 510 and 515 of FIG. 5 (only one of each chirality is shown in FIG. 5 for clarity) simply replace the Criss optical lines 110 in one wrap direction and the Cross optical lines 115 in the opposite wrap direction of FIG. 1 respectively, but because they are wide, they fill in the gaps left if using narrow optical or sensor lines. This does not overtly enhance the resolution since the width of the WOLs is nominally the same as the spacing between the optical lines to achieve similar resolutions. However, if a projectile strikes near the adjoining edges of two WOLs, and in so doing causes simultaneous signals to be generated in the adjoining WOLs channels, it may be possible to interpolate between the WOLs and in so doing improve the impact location resolution possibly by a factor of 2 to 3 versus the width of the WOL alone defining the accuracy. Conversely, one might widen the WOL by a commensurate amount and thereby reduce the number of channels needed to cover the target with the same/similar resolution. This in turn could result in the need for fewer WOLs and associated channels, or the ability to cover more area with the same number of channels and same resolution and coverage.

Note that in FIG. 5 only one WOL wrapped in a clockwise direction and one WOL in a counterclockwise direction is shown, whereas similarly just as FIG. 1 shows a multiplicity of semi-parallel optical lines, there would be a similar multiplicity and layout of WOLs covering target 100 of FIG. 5. Nominally all WOLs wrapped in one direction on the cone could and likely would touch neighbors at edges thereof and thereby comprise a layer of WOLs all wrapped in one direction. All WOLs wrapped in the opposite direction would be similarly self-aligned and laid out except for the opposite rotation of the wrap. So basically one simply replaces the sensor/optical lines of FIG. 1 with WOLs in both wrap directions.

Since each of these two layers of counter wound WOLs would likely (but not necessarily) be notably thicker than the thickness of individual optical lines in FIG. 1, finite thickness of the WOLS would need to be accounted for in an impact timing correlation algorithm used to determine impact location. Furthermore, thickness of, or at least separation between the two layers also affords an opportunity for timing impact arrival of each projectile through each counter wound layer, and by knowing thickness and any separation distance between the layers, an estimate of impact velocity may be made via "d=vxdt". Here "d" is the separation distance between the two layers, potentially including the layer thicknesses if a spacer separates the layers and is comparable to the thicknesses, or alternatively equal to the thickness of the first layer if there is little or no separation layer. Also "v" is normal (usually radial) velocity of the projectile, and "dt" is time difference between signals from each of the two layers. As long as the time between signals from each of the two layers is shorter than the time between any two or more projectile hits, detections will be apparent as pairs of detections, one from each layer close in terms of time of detection. In this way the WOLs can be also used to provide an estimate of the projectile's normal velocity. If the projectiles arrive at about the same time difference as the time difference between the detections from the layers for an individual projectile, disambiguation may be more difficult but should be decipherable through use of a priori information on expected velocities and multiple hypothesis formulation to determine most likely hits and associated velocities. It should also be noted that although the above discussion focused on WOLs in connection with FIG. 5, the exact same physics holds for counter wound fibers or thin lines separated by a spacer layer is disclosed subsequently in regard to FIGS. 14, 15 and 16.

FIGS. 6A-6D illustrate different views of a generic cone target shell 600 and some of its potential internal structure comprising annular structural ribs 610, 620, 630 near an interior front, middle and rear of cone target 600 respectively. Of course, actual targets may have more or fewer such annular ribs, as well as longitudinal ribs and potentially other support structures as well. However, annular rings are common in such targets and will serve to illustrate the principles for installation of the invention into an interior of such targets without loss of generality to other variations of structure likely to be seen in specific targets. Also shown is a Cut Plane "A" 699 down the longitudinal axis of the target for later reference in FIG. 8.

When installing the invention on the inside of a target, a key concern is how to route, register and attach a grid of sensor/optical lines or WOLs over internal structures (such as the aforementioned annular ribs), while providing robust mechanical attachment that can withstand launch environments (particularly acceleration and vibration forces), without violating the bending radius limits that accompany almost all sensor lines of interest for these applications, and finally while also providing precise registration to the target vehicle so that projectile impact locations can be known precisely with regard to internal target vehicle structures. The current approach to meeting these needs to employ a specifically designed mounting molding that registers to the interior structures of the target, and provides mechanical means and associated labeling for mounting and securing the sensor/optical lines or WOLs precisely where needed to produce precise target body registered hit locations.

Figure 7A:
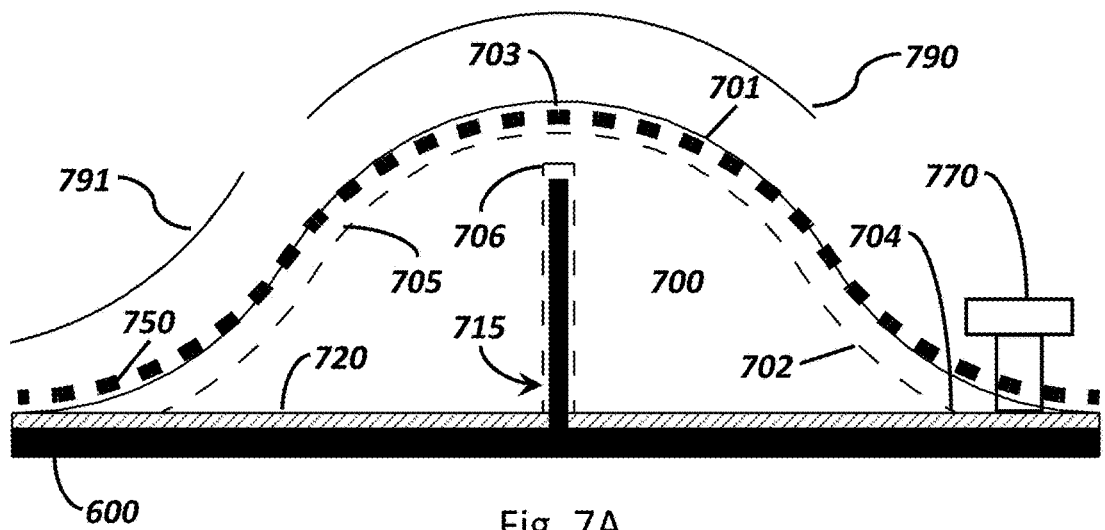
FIGS. 7A-7B are diagrammatic views of construction details for a nominally flexible mounting fixture to mount the invention to the target's internal structures.
Figure 7B:
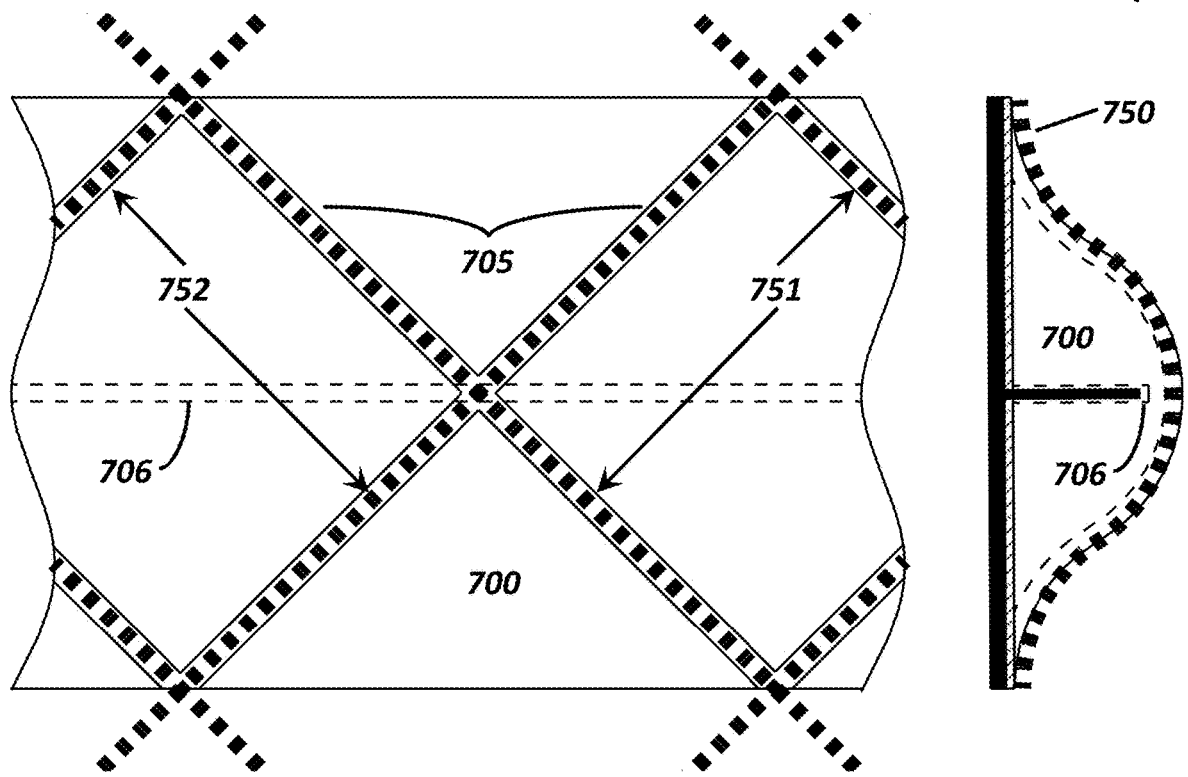

FIGS. 7A, 7B illustrates a proposed solution, comprising a molding that fits over and attaches to intervening interior structure, providing a bridge over said structure with sufficiently gentle, smooth and rounded bevels and fillets to permit the sensor/optical lines to ride over the structure obstacle and also be well attached to it. Note that the rounded bevels and fillets are of a bend radius sufficiently large so as to no violate the minimum bend radius of the sensor/fiber lines or WOLs used. Note also that by applying an alignment marking on the molding, and a matching alignment marking at a proper circumferential location on each given circumferential rib, then each molding can be exactly and precisely registered to the geometry of the target so that the moldings enforce exact known placement of the sensing/optical lines on a target's inner surface. Likewise then the entire sensor grid is aligned and registered to the target making possible measurement of absolute projectile penetration location through the grid with reference to target stations.

A cut-away view of molding 700 is shown in FIGS. 7A and 7B. This molding may be made of most any material (including metal and/or ceramic, wood, plastic), but would generally be selected from one of the many types of plastics or rubbers that afford flexibility for ease of installation as well as some vibration damping, and may also be selected for emission of light upon impact by a projectile to enhance projectile detection by breaking sensor/fiber lines or WOLs. It may be constructed by casting, injection form molding, by milling or by other means. Where a flexible rubber or rubber-like material is used, a generic molding may be fabricated in advance and cut or otherwise configured when installed.

As shown in FIG. 7A, an outer surface 701 of molding 700 supports the aforementioned rounded bevels and fillets with radii greater than the minimum bending radius of the sensor lines or WOLs. In this way the molding supports a respective sensor line to ride up and over a structure rib 715 (one of 610, 620 or 630 in FIGS. 6B, 6C and 6D) that is structurally affixed to the target shell or skin 600 of a target. Molding 700 has a slot 706 cut or cast into it to accept the rib 715. The molding may be secured to the rib 715 and interior shell or skin 600 by an adhesive 720, or it may be secured with traditional fasteners (not shown) transiting through molding 700 and rib 715 and/or through molding 700 and shell or skin 600.

Molding 700 may have grooves 705 cut or molded into its surface that are deep enough and wide enough to accept sensor/optical lines 750 (which may be any from the set 110, 115, 150, 151, 152, 160, 161, 165, 400, 430, 440, 450, 510 or 515, as well as those shown subsequently in FIGS. 14, 15 and 16), thereby registering them properly for their absolute location and secure them well to the inner side of the target. Sensor/optical lines 750 are well seated in respective grooves at apex 703 of molding 700, but may either begin to ride a bit out of their grooves near 702, or the grooves become more shallow towards edges of moldings 704. In either case, sensor/optical lines 750 become substantially flush with an inner surface of shell or skin 600, and are glued to both molding 700 and shell or skin 600 throughout.

Alternatively, a concave cap 790 and/or a convex cap 791 might be applied over the sensor/optical lines in their grooves of the molding, either with adhesive or fasteners, to securely retain the lines in their grooves. Alternatively, a total cap (not shown) having the same shape as the molding could both cover, retain and protect sensing/optical lines across an entire width of the molding and its coverage of the ribs.

It should also be noted that accommodation may be made for thermal or flexure expansion and tensioning of lines 750 through use of some slack in the lines 750 around 702 and 705, with grooves 702 designed to integrate such slack. Optionally, a retainer post or similar rounded line capturing protrusion 770 may be added to either side of each groove 705 near either edge 704 of the molding so as to register, capture, retain and provide a bend radius and stress relief for the lines 750.

FIG. 7B also shows a view looking down on molding 700 (looking from inside out when 700 is mounted on circumferential ribs 610, 620 and 630). Slot 706 for the ribs is seen edge on in this view, albeit hidden by top surface 701. From this view sensor/optical lines 751 are nominally Criss Lines 110 and lines 752 are Cross Lines 115. In this particular design they cross along a circumferential centerline of molding 700 (above the circumferential rib), but their actual crossing points can be elsewhere on molding 700 and in fact will be dictated by a wrap angle, sensor/optical line spacing and rib locations more than anything else. As noted earlier, sensor/optical lines 751 and 752 lie in grooves 705, and the grooves would ideally be deeper (not shown) where lines 751 and 752 cross so they do not stick up above molding 700, although such a protrusion might be acceptable for a given specific design.

Figure 8:
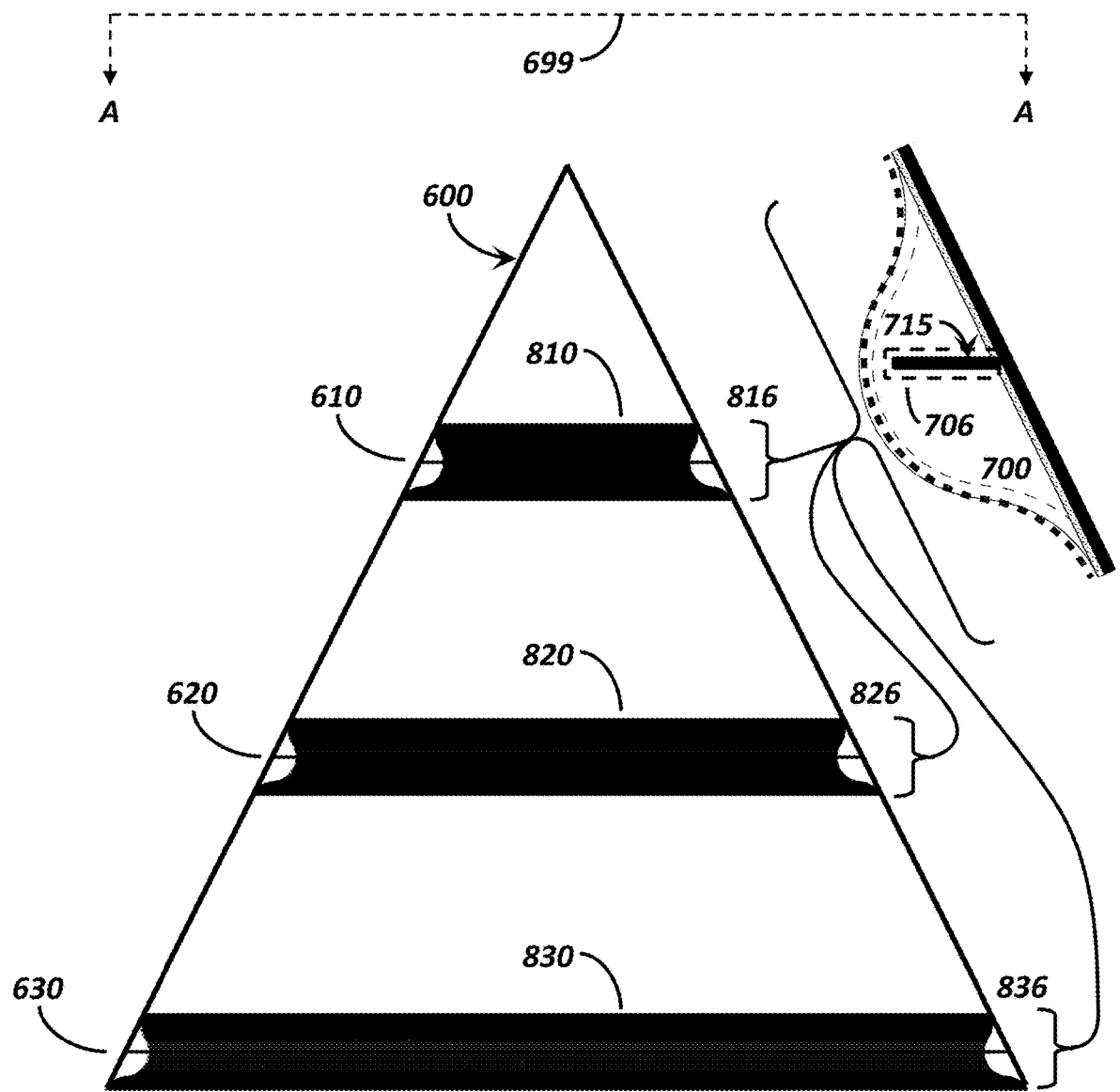
FIG. 8 is a diagrammatic view of Cut A down the longitudinal axis of the target showing how the mounting fixture construction elements of FIGS. 7A-7B are used to capture the ribs or other internal structural elements of the target.

FIG. 8 shows a vertical cut "A" 699 (see FIGS. 6A and 6D) through an exemplary cone target of FIG. 6. Shell or skin 600, and aforementioned exemplary three annual ribs 610, 620 and 630 are indicated. Because of the conical shape, circumferential ribs 715 are not perpendicular to target cone shell or skin 600 (FIGS. 6A—6D), requiring rib capture groove 706 to be angled for each respective molding 810, 820 and 830, as shown in cuts 816, 826 and 836 respectively.

It should be noted that although the moldings 810, 820 and 830 (FIG. 8) might each be one piece of length sufficient to cover an entire circumference of ribs 610, 620 and 630 respectively, each molding 810, 820 and 830 may each comprise two or more possibly different length sections that together cover ribs 610, 620 and 630 circumferentially. In this way, the moldings may be made to easily insert between other internal obstacles and fixtures, such a longitudinal internal ribs. It should also be noted that sectioned moldings can be used to enforce location registration for the sensor/optical lines or WOLs since they would typically insert in specific places between internal structures, thereby self registering such sensor/optical lines or WOLs. Additionally, it should be noted that sectioning the moldings makes them easier to physically install inside a target cone or structure, since space may be tight therein.

Figure 9:
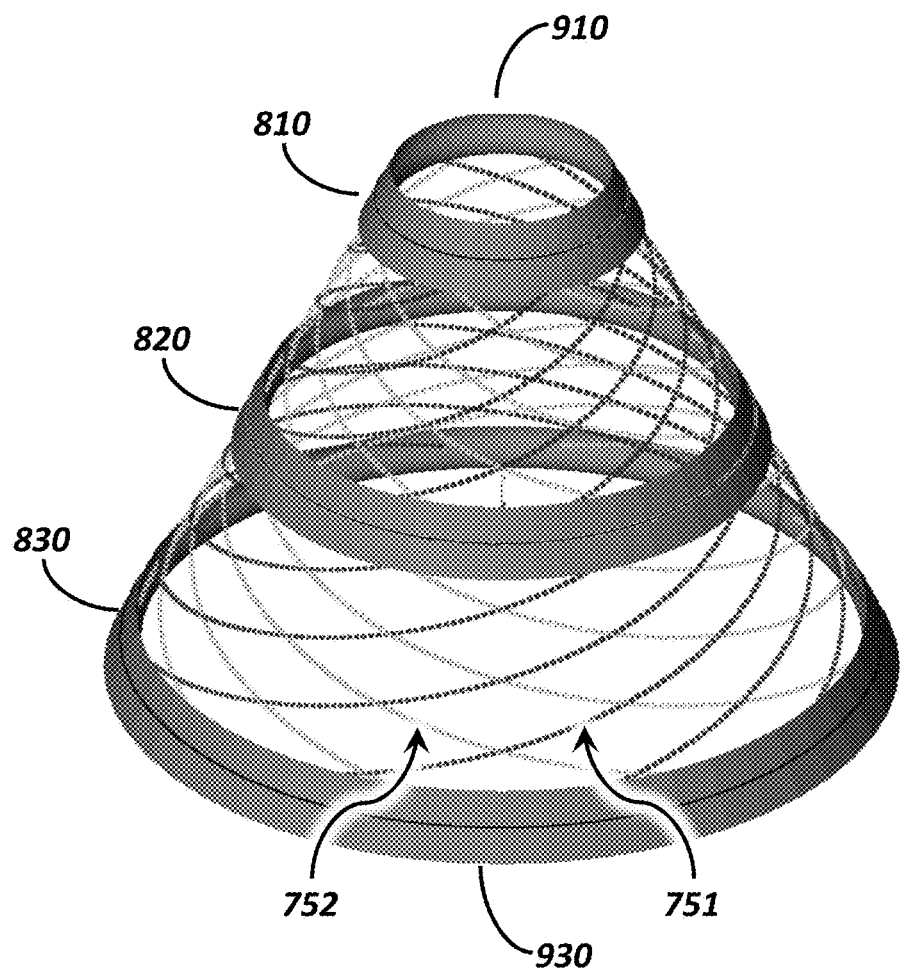
FIG. 9 is a diagrammatic illustration showing construction details using the structures of FIGS. 7A-7B and 8 with the target shell/skin and ribs removed for clarity.

FIG. 9 shows moldings 810, 820 and 830 with the entire target cone skin/shell 600 and structure (610, 620 and 630) made invisible, as well as an exemplary grid of sensing/optical lines, with 751 wound in the Criss direction and 752 wound in an opposite Cross direction. Note that grooves retaining the lines are on the inside of the moldings, with an outside of the moldings glued or otherwise attached to target cone shell, skin and ribs. Also shown are a top edge of top molding 910 and a bottom edge of lower molding 930 which will be referenced shortly.

Figure 10:
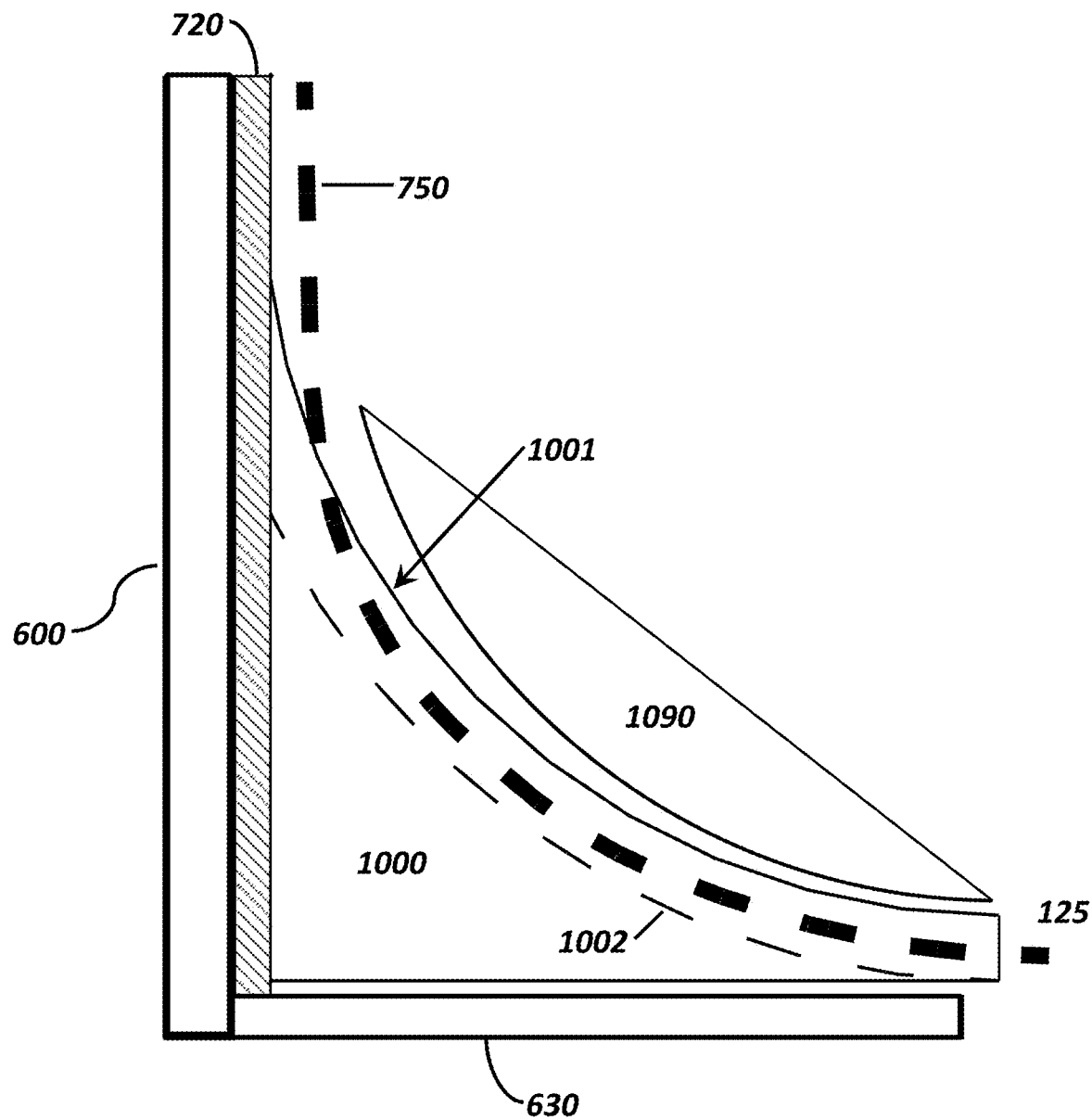
FIG. 10 is a diagrammatic view of alternate construction details used for lower corner ribs.

The description so far has disclosed the installation, registration and retention of sensing/optical lines and WOLs within the interior surface of an exemplary conic target. FIG. 10 illustrates one way by which sensing/optical lines and WOLs may be directed 125 off a target interior structure (rib) and towards an interior point where detections could be measured with detectors 135 and thence telemetered and recorded. To accomplish this, molding 700 is replaced with a different designed molding 1000 that is captured in an angle formed by target shell or skin 600 and a lowest rib of structure 630 to which the sensor is to be installed for coverage. Note that this may not be the absolute last annular rib in the target structure, but it is the last rib to which the current sensor is to provide coverage.

Analogous to FIG. 7, this bottom corner molding 1000 comprises a fillet 1001 into which is formed or cut a multiplicity of grooves 1002 that are deep enough and wide enough to capture and retain sensing/optical lines or WOLs 750. This molding 1000 is glued 720 and/or mechanically affixed to rib 630 and/or shell or skin 600. The optical lines may transition to be flush with shell or skin 600, or just emerge from molding at 125 and thence route to detectors 135 (not shown) further interior to the target. A nominally concave retention appliance 1090 not unlike 791 may be glued and/or mechanically affixed over lines 750 to firmly secure and protect them within the molding structure. Note that the molding could extend inward towards the target's longitudinal centerline from 125 in FIG. 10 and could comprise an entire bulkhead across the target cone with the detector and other hardware 135 mounted thereto and near the centerline of the target cone vehicle. Note also that molding 1000 can optionally incorporate a retainer post or similar rounded line capturing protrusion similar to 770 shown in FIG. 7A

Figure 11:
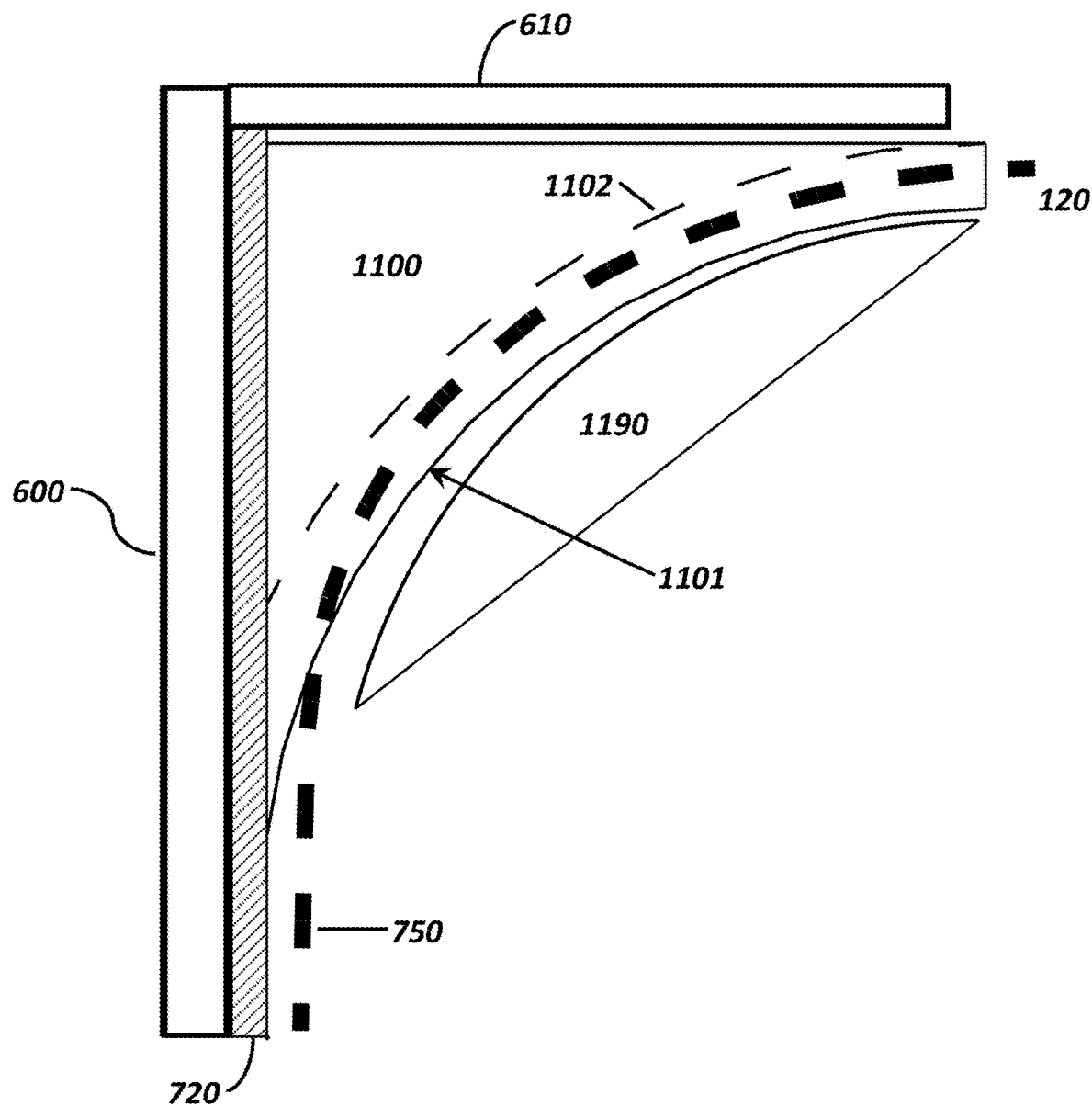
FIG. 11 is a diagrammatic illustration of alternate construction details used for upper corner ribs.

FIG. 11 shows the exact same molding concept as in FIG. 10, but flipped and applied to an underside of top circumferential rib 610. Analogously, 1100 is the molding, 1101 the inside surface of the molding, 1102 the bottom of the sensing/optic line grooves, 600 is the target cone shell or skin, 720 is an adhesive to affix the molding 1100 to the rib 610 or shell or skin 600, 750 are the sensing/optical lines or WOLs, and 1190 is a retention applique either glued or fastened to the molding 1100 in order to securely retain the lines 750 in their grooves. Similar to FIG. 10, the sensing/optical lines go both down shell or skin 600 to provide coverage for detecting penetrating projectiles, and are collected at 120 to connect to detectors at 125 of FIG. 1. Again, just as for FIG. 10, molding 1100 may be extended into a bulkhead that spans a portion of or an entire diameter of the cone target at the narrow end, thereby providing a mounting structure to secure upper detector block 125 to near a longitudinal center line of the cone target. Also note that molding 1100 can optionally incorporate a retainer post or similar rounded line capturing protrusion similar to 770 shown in FIG. 7A

Figure 12:
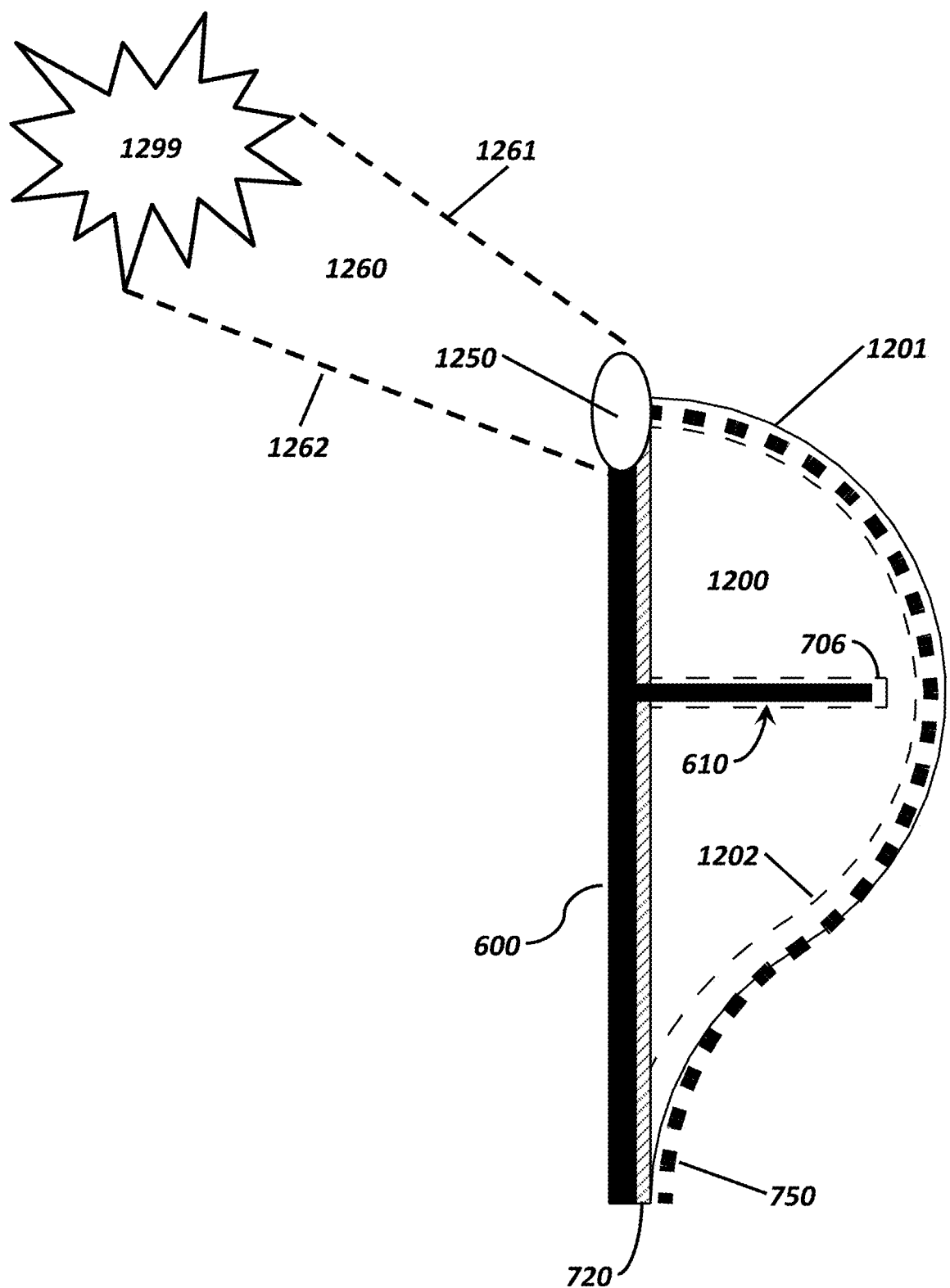
FIG. 12 is a diagrammatic illustration showing alternate construction details of molding for circumferential ribs incorporating an optic for viewing a warhead or other event external to the target.

FIG. 12 is an extension of FIG. 11 using aspects of FIG. 7. In this specific case, shell or skin 600 extends slightly beyond upper rib 610. This would be in keeping with a conical target that nominally terminates in a point apex. Molding 1200 captures and is installed on upper rib 610 as previously described. Sensing/optical lines or WOLs 750 are captured in their respective grooves 1202, but this time terminate in a lens or similar optic 1250 nominally mounted into the shell or skin 600 and with a field of view 1260 with upper and lower (and left and right) limits 1261 and 1262 respectively, that collects energy from an outside environment proximate to the conical target. The sensing/optical line or WOLs in this particular case must be of an optical type due to employment of terminating lens or optic 1250. However, alternate transducers might still be employed: for example replacing lens or optic 1250 with an antenna and optical lines or WOLs 750 with RF cables connected to the antennas to detect proximate electromagnetic pulse energy.

The purpose of lens or optic 1250 is to enable viewing of either an approach of an interceptor or other body, and/or to witness and measure time of detonation of an explosive fragmenting warhead proximate to the target. Such a detonation 1299 will happen a significant time before actual impact of projectile fragments, allowing the warhead detonation to be clearly separable in time from the impact of penetrating projectiles from the warhead. Additionally, depending on an amount of overlap of fields of view of lens/optics 1250, explosive flash 1299 should be simultaneously visible in several of lines 750, thereby identifying it as a warhead detonation, and also providing a precise relative time stamp and angular direction of warhead detonation with respect to subsequent impacting of resultant projectile fragments. If more than one fragmenting warhead were detonated within a short interval, both detonations might be viewed and recorded. This scheme also may permit viewing and measuring time of a last few thruster divert firings prior to impact of a hit to kill interceptor to aid in post impact diagnostics. Detection of the Sun so as to know absolute target vehicle orientation is also a possible application. A similar embodiment to FIG. 12 might be designed within the confines of a volume in FIG. 11 without needing to route sensor lines over rib 610 as shown in FIG. 12, wherein lens or optic 1250 might be disposed through shell or skin 600 at most any location below upper rib 610 and above lower rib 630.

It is obvious that although placement of the sensing capability described with respect to FIG. 12 is located at top rib 610 of the cone target, indeed lens or optic 1250 may be placed reciprocally at bottom rib 630 of the cone target, or really at any location along the cone target body if splitters are used to splice the optic signal or signals from 1250 into lines 750. Of course, dedicated lines could also be used to bring the signal from lens or optic 750 to detectors. However, this defeats the principal of simplicity and economy afforded by an approach like shown in FIG. 12 that essentially double purposes the same lines for both the external sensing and projectile impact sensing.

Figure 13:
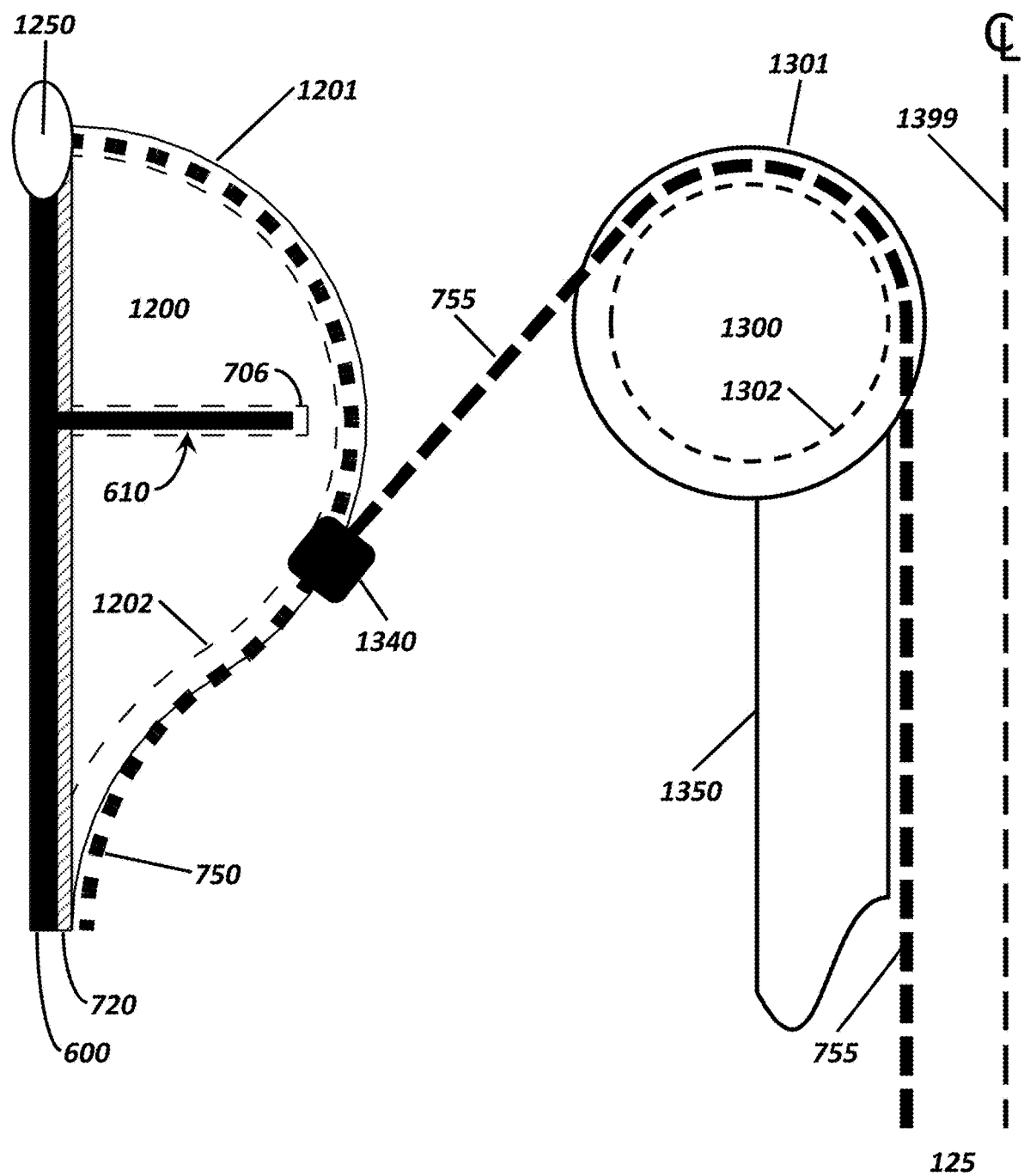
FIG. 13 is a diagrammatic view showing alternate construction details of the invention incorporating both an optic for viewing a warhead or other event external to the target, plus a splitter routing to another detector to enable additional multiple simultaneous detections.

FIG. 13 illustrates one such concept within the context of FIG. 12. The left half of FIG. 13 is almost identical to FIG. 12, except that now splitter 1340 has been introduced into lines 750. Splitter 1340 may be recessed into molding 1200 to secure the splitter and as described in prior figures, a retention applique (not shown) might also be used to ensure firm structural retention of the components to shell or skin 600 and ribs 610. Split off lines 755 may be routed (usually tied off to other structures following good wiring harness engineering practice) to another molding 1300 centrally located inside the cone target. Nominally 1300 is an annulus centered on the longitudinal axis 1399 of the cone body. But this is not essential. What is essential is that some form of structure 1300 be made available to support the lines 755 and to provide a controlled radius of curvature that does not violate a minimum bend radius limit of lines 755.

Annulus molding 1300 has an outer surface 1301 and grooves 1302 to capture, support and constrain movement of lines 755 in an analogous manner to grooves previously described for FIGS. 7, 10, 11, and 12. Lines 755 may be glued into grooves 1302, and/or retained with a retainer applique (not shown) that may be glued or mechanically fastened to molding 1300 to retain all lines 755. Lines 755 may be fed down a conduit tube 1350 coaxial with the same centerline 1399 of the cone target to a base 102 of the target where they may join other lines in the base in bundles 125 going to sensor blocks 135. In other embodiments, lines 755 might be routed under molding 1300 thereby reversing direction to bundles 120 and thence to detector block 130. An advantage of routing lines 755 towards the base of the target is that power and telemetry are often centrally located in a base 102 of a target (FIG. 1). An advantage of running lines 755 down a centerline of the target as shown in FIG. 13 is that penetrating projectile fragments will not traverse or hence sever lines 755 until after the projectiles have first been detected while breaking lines near the shell or skin surface of the target 600. Specific test requirements for each test will determine a best arrangement from those described above and combinations thereof.

Figure 14:
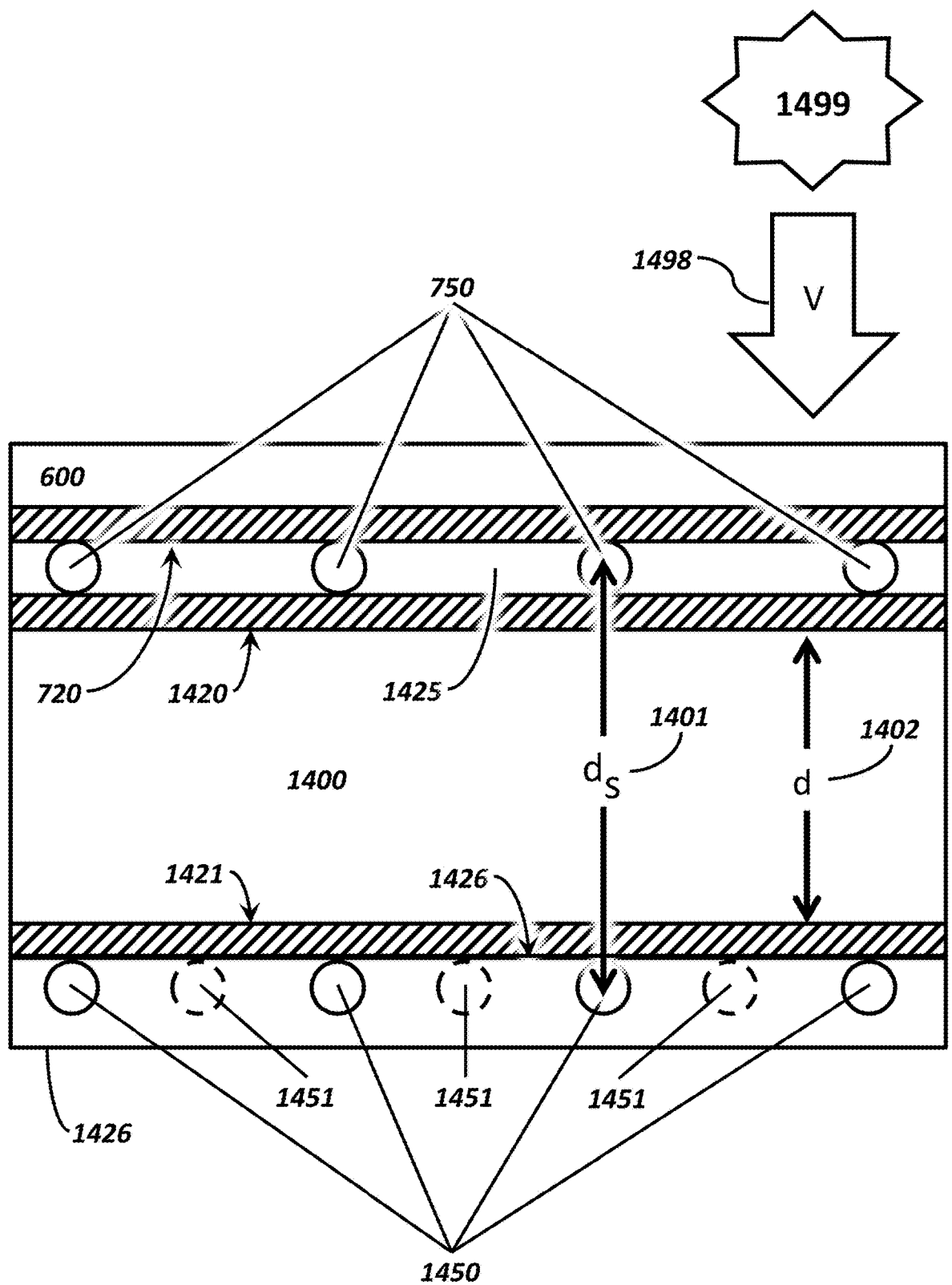
FIG. 14 is a diagrammatic view showing construction details of the invention incorporating multiple layers of fiber sensors for velocity measurement and light enhancement materials.

FIG. 14 illustrates a means for measuring normal velocity 1498 of impacting fragments from explosion 1499, usually radial with respect to shell or skin 600, using further variants of the invention disclosed to this point. The implementation and installation is substantially similar to that described above, but may alternatively be partially implemented with "panels" that can be applied between the circumferential ribs (for example between 610 and 620) and also between any longitudinal ribs or other internal structures. Between the ribs (for example between 610 and 620), sensing/optical lines or WOLs 750 are glued 720 to shell or skin 600 or otherwise mechanically retained and affixed. A filler material 1425 may be inserted or applied to fill in gaps between lines 750. Alternatively the lines 750 may be inserted into grooves of a sheet that is the material 1425. This filler material 1425 may be of the same adhesive as used in 720 (FIG. 7A), or it may be a different adhesive, or a thin strip of a spacer material or it may be a combination of a thin strip of spacer material glued in between lines 750, or it may be the said thin sheet with grooves to capture lines 750.

A particular novelty of the invention is to optionally select a material or a set of materials for filler 1425 that produces copious light upon impact by energetic projectile fragments, thereby enhancing a source of light beyond thermal radiation from heat of impact. Although some such materials may be of a pyrotechnic nature (for example magnesium or even an explosive material), many other materials exhibit such light emitting behavior as described in U.S. Pat. Nos. 6,931,166 and 7,197,197. A key mechanism of enhancement herein is for lines 750 to be in close proximity to light enhancing filler material 1425, ideally embedded in it, such that when a projectile breaks line 750, and while also breaking light enhancing material 1425, light from 1425 can infiltrate a broken line 750 to provide an enhanced light signal for impact detection. It should be noted that light from filler 1425 may often be of shorter wavelength, and both lines 750 and detectors (125 and 135) need to be selected to support this shorter wavelength light as well as longer wavelength heat related radiation. Under lower velocity impacts which may generate less heat during impact, it might prove advantageous to forgo thermal wavelength detecting capability in deference to enhanced shorter wavelength light from filler 1425. The specifics of the implementation will dictate a best set of design trades for a given scenario. Ideally, one would prefer to design for detecting both thermal radiation from impact heat as well as an enhanced shorter wavelength radiation from 1425.

In FIG. 14, 1420 is another adhesive layer nominally similar to 720, but possibly tailored to the materials it much join. Layer 1420 also may be selected to provide enhanced light emission upon impact of a projectile fragment.

Spacer 1400 provides a well defined distance 1402 across a face of the detector surface from which to time duration of a fragment or projectile crossing from lines 750 to a similar set of lines 1450, an actual distance between signals generated by the projectile being nominally ds (1401). Layer 1421 is another adhesive layer similar or identical to layer 1420. Layer 1426 is a final "cap" layer over lines 1450 that is very similar to layer 1425 and which nominally possesses similar attributes for production of light upon projectile impact.

By measuring a difference in time of detection dt of closely time correlated pairs of detections between lines 750 and 1450, and using their separation distance ds (1401), an estimate of normal velocity 1498 may be obtained from V=ds/dt. It should be noted that lines 1450 need not be directly opposed from lines 750 and in fact can further refine impact location if they are instead interstitial (1451) to the illustrated opposing installed lines 1450.

A similar measured estimate of normal velocity may also be achieved by simply introducing a spacer (1400) between two oppositely wrapped layers of optical lines in FIG. 1, wherein Criss Lines 110 of FIG. 1 become lines 750 of FIG. 14 and Cross Lines 115 become lines 1450. Additionally or alternatively, all lines 750 may be WOLs or 1450 may be WOLs. With spacer 1400, the timing of hits will typically comprise temporally correlated pairs between lines 750 (110) and 1450 (115), that can still be identified as originating from the same projectile, but whose difference in time of hit can indicate velocity as described above.

Figure 15:
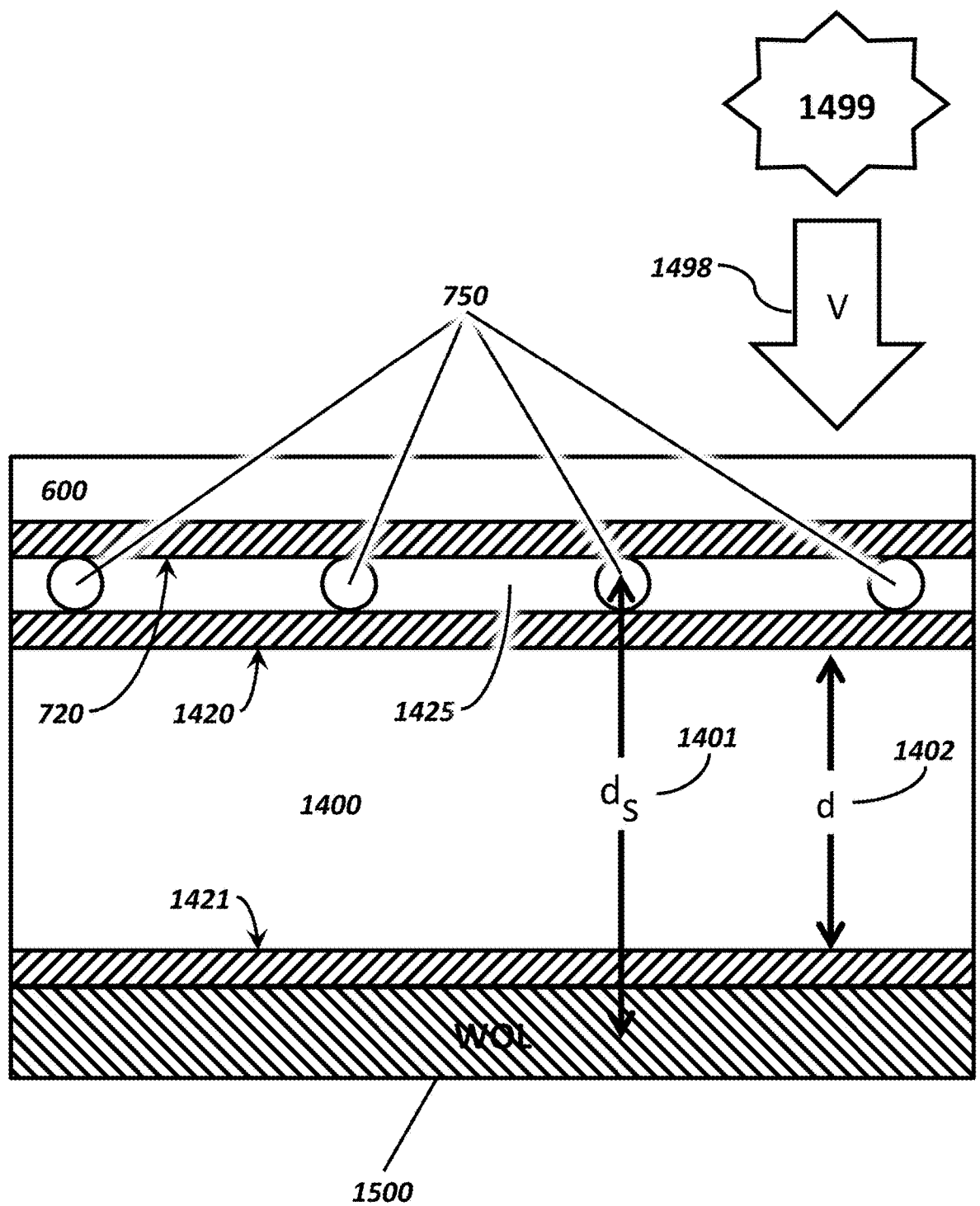
FIG. 15 is a diagrammatic view showing alternate construction details of the invention with a wide optical line (WOL) for measuring velocity and light enhancement materials.

FIG. 15 is substantially the same as FIG. 14 except that a WOL 1500 has replaced layer 1426 and its associated lines 1450 or 1451. This has the advantage of requiring only one detector channel per WOL employed while still being able to determine impact velocity through time correlation of signals from 750 and 1500. It is recognized that if there are a large number of projectiles hitting at substantially the same time, it may be difficult to time resolve the multiple impacts through 1500 from those through lines 750 that are spatially resolved. This is addressed through use of fast electronics, sage design and nominally AC coupling, as well as by limiting an area covered by an individual WOL 1500 even if lines 750 span an entire target body, thereby employing multiple WOLs 1500 spaced by 1400 under primary spatial detection sensing/optical lines or WOLs 750.

In the face of multiple near simultaneous projectiles, near simultaneous impact correlation timing (hence velocity) and position determination may be difficult. However, a precise time correlation needed for unambiguous location determination while still measuring velocity may still be retained if instead of adding a spacer 1400 between counter wrapped optical line layers (110 and 115) of FIG. 1 (alternatively between 750 and 1450 of FIG. 14), a spacer 1600 is placed on an inside side of an inner most wrapped optical line layer as shown in FIG. 16, and then a third separate detection layer 1650 of either sensing/optical lines or a WOL is applied to an inside of spacer 1600. Time of arrival difference from first and/or second optical line layers 750 and 1450 (or 1451) through spacer 1600 to third detection layer 1650 inside of them all, permits direct measurement of projectile velocity while suffering no increase in position location ambiguity. Obviously, stacking order of layers 1, 2, 3 vs 3, 2, 1 or 3, 1, 2 is irrelevant to normal (radial) velocity determination as long as the spacer is between third detection layer 1650 and at least one of the other two layers 750 and/or 1450.

Figure 16:
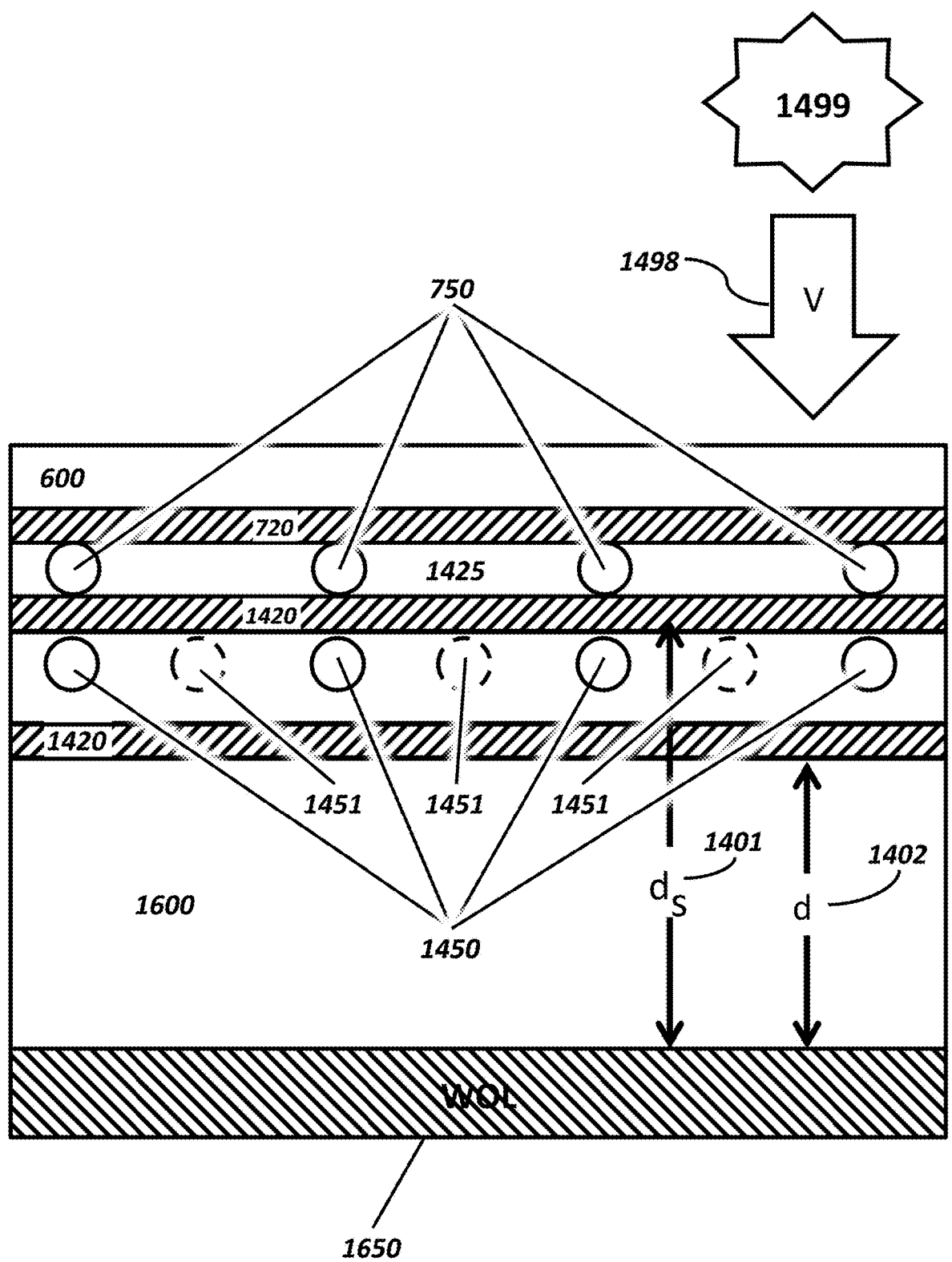
FIG. 16 is a diagrammatic view of alternate construction details of the invention incorporating both additional layers of fiber sensors and WOL for enhanced position and velocity measurements and light enhancement materials.

FIG. 16 is nominally for helical winding of lines like shown in FIG. 1, but can also represent a layout with a more orthogonal curvilinear grid layout. Furthermore, due to greater ease in designing with and working with pseudo-orthogonal coordinate systems, there is potential motivation to use such arrangements, particularly on targets that can be easily represented in those coordinate systems. These considerations lead us to consider pseudo orthogonal grids as one embodiment of the instant invention.

For small targets, or for targets with restrictive access to an inside of the target for installation, it may be desirable to both design and install the sensor system in more manageable subassemblies, such as sectional panels that can be locally installed in discrete steps. This both eases installation by breaking the task down into a number of discrete panel installations, as well as affording an opportunity to only instrument one side of a target without having to instrument the whole target. This idea can embrace the helical wrap orientation promulgated in all the figures to this point, or it can employ a more rectilinear coordinate system such as a conic coordinate system shown next.

Figure 17A:
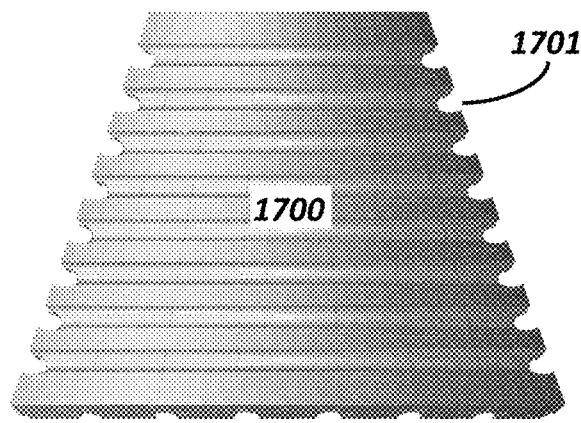
FIGS. 17A-17D are diagrammatic views showing construction details of the invention employing pre-assembled panels to mount fiber or WOL sensors to in order to ease installation into the target vehicle and provide an alternate mounting method.
Figure 17B:
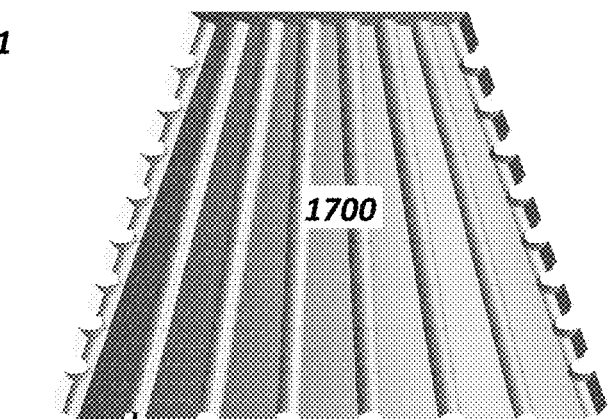
Figure 17C:
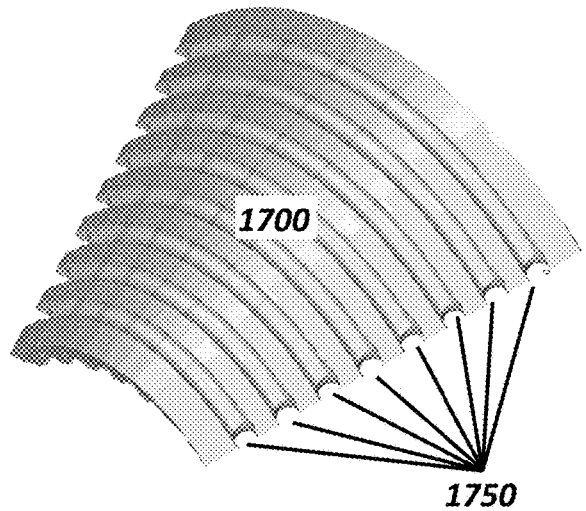

FIGS. 17A, 17B, 17C illustrate a representative quarter section panel for a cone target between a first rib 610 and a second rib 620. The panel could be glued to the inside of shell or skin 600, and/or fastened either with adhesive or fasteners to ribs 610, 620 and 630, as well as longitudinal ribs 651 on the left and 652 of the right or other internal structures. Panel 1700 has horizontal grooves 1701 on one side (outside here in FIG. 17A) and vertical grooves 1702 (inside here in FIG. 17B), to capture and secure sensing/optical lines and WOLs analogous to 751 and 752 described for FIG. 7 and subsequent figures. The lines or WOLs may be glued into the panel 1700 grooves with adhesive and/or they may be secured with a mechanical applique (1890 in FIG. 18) affixed with glue or mechanical fasters like for 1090 illustrated in FIG. 10 and and 1190 in FIG. 11.

Figure 17D:
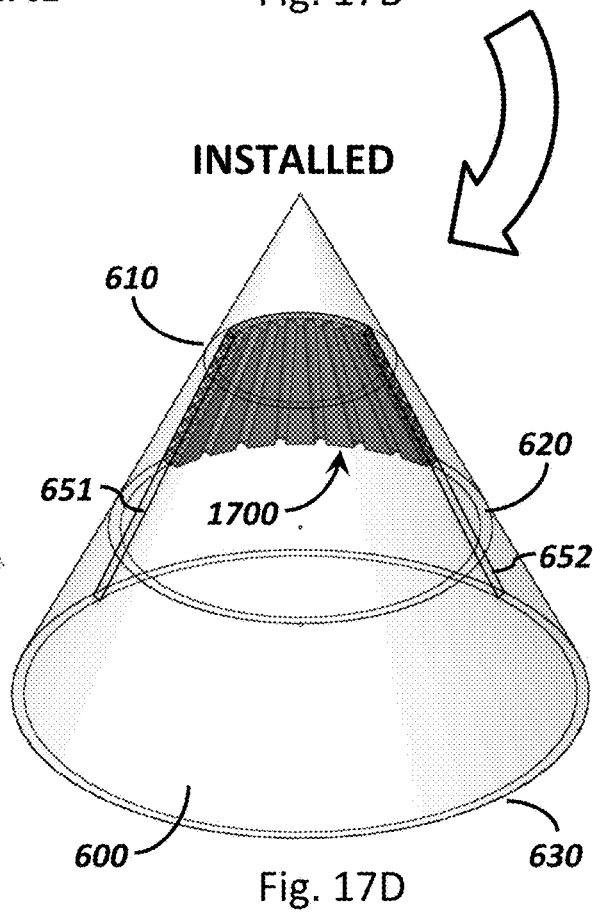

FIG. 17D illustrates panel 1700 mounted inside its intended position within the cone target. Although a quarter panel is shown, it should be obvious that any annular section size may be used such as 45 degree, 30 degree, 60 degree or even up to 180 degrees of circumferential azimuthal sections. A key advantage of using panels with less than 180 degrees in circumferential azimuth is ease of installing smaller panels inside the cone vehicle, particularly if there are other structures within it to avoid.

Figure 18:
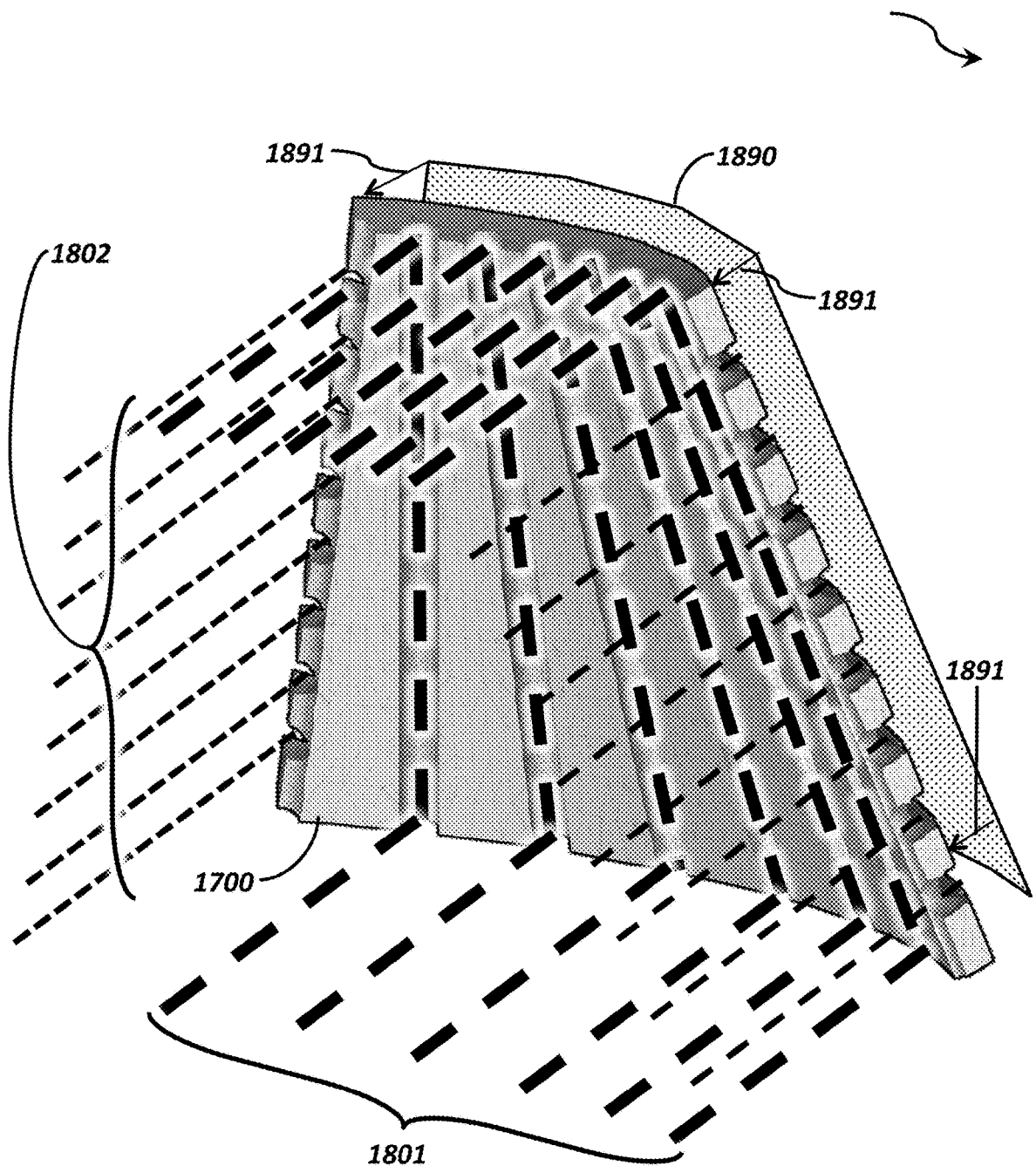
FIG. 18 is a diagrammatic view showing construction details of a pre-assembled panel for eased and modular installation of invention.

FIG. 18 illustrates one means by which panel 1700 may be connected and routed to line bundles 125 and 135 and subsequently to detectors 125 and 135 for each orthogonal wrap respectively. Criss wrap 110 and Cross wrap 115 here are rotated to a vertical set of lines or WOLs 1801 and horizontal lines or WOLs 1802. The lines 1801 and 1802 are retained in the panel grooves by adhesive and/or the application of a cap or appliance 1890 also held by adhesive or fasteners onto the outside of the panel in directions 1891 to secure the lines 1802. A similar cap or appliance (1895, not shown) may be applied to the inside in the opposite direction of 1891 to secure lines 1801 on the inside side of panel 1700.

Panel 1700 has radii 1750 (FIG. 17) on the ends of both vertical and horizontal grooves to ensure that line radius of curvature limits are not exceeded when bending from the plane tangent to cone shell or skin 600, to the inward radial direction. It is preferred that lines or WOLs be routed radially inward from panel 1700 as shown in FIG. 18 so as to minimize chances of multiple lines being severed by one projectile. Such radially inward lines or WOLs would be routed to and accepted by a central routing conduit similar to 1350 shown and discussed in FIG. 13. This routing can be done in a way to still leave room for other hardware within the interior of the instrumented target.

Alternatively, lines 1801 and/or 1802 may be jumpered and connected to neighbor panels, usually across the ribs that define and secure the panels to the internal structure of the target. Furthermore, as mentioned before, the lines can be conically gridded as shown in FIG. 18, or diagonally gridded like FIG. 1. Regardless, jumpering the lines from one panel to another implements the same contiguous grid as described throughout most of this disclosure while affording a potentially easier modularized manner for assembly and installation Where panels are being constructed, jigs may be fabricated that mimic the structure to which the panels are to be installed. In some embodiments, flexible generic panels may be fabricated that can be installed on either exterior or interior surfaces of a target. In these embodiments, the detection lines may be run orthogonally to each other or diagonally to each other, and have connectors where the detection lines emerge from the panel for connecting to other panels or to a detection unit. Materials selected for these panels would be of a character such that they would bend relatively easily until a bending radius of the detection lines is reached, after which bending of the panel would become more difficult. This may be accomplished by a careful selection of plastics from which the panels are constructed, or by imbedding semi-rigid members having increasing stiffness responsive to bending in the panels themselves.

The present invention may be applied to a wide variety of surfaces and/or volume geometries which admits the surface application of sensing lines such as optical fibers, or WOLs, and furthermore is amenable to the immersion in and wrapping around or surrounding of a solid or liquid energetic material. It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims, wherein we claim:

The invention claimed is:

1. A system for detecting, locating, and recording one or more hit or contact indicating events, said system comprising:
   a flexible grid of optical sensing lines configured for wrapping around at least an interior or exterior portion of a target, said flexible grid comprising a first set of separate and discrete optical sensing lines and a second set of separate and discrete optical sensing lines;
   a passive optical signal detector functionally coupled to each end of each separate and discrete sensor line; and
   optical splitters and passive optical signal detectors disposed along each of said separate and discrete optical sensing lines;
   wherein optical sensing lines of the first and second sets of separate and discrete optical sensing lines cross over one another but no optical sensing lines of the first set of separate and discrete optical sensing lines cross over one another and no separate and discrete optical sensing lines of the second set of optical sensing lines cross over one another.

2. The system of claim 1, further comprising a filler material in gaps between the separate and discrete optical sensing lines.

3. The system of claim 2, wherein said filler material produces light upon impact by energetic projectile fragments.

4. The system of claim 1, wherein the separate and discrete optical sensing lines are at least partially imbedded within a skin of said target, mounted to an inner surface of a skin of said target, or attached to structural members adjacent an inner surface of a skin of said target.

5. The system of claim 1, wherein the flexible grid of separate and discrete optical sensing lines is embedded in a filler material that forms a panel configured to be installed in or on a target body.

6. A method for detecting, locating, and recording a hit or contact indicating event on a target body, said method comprising:
   associating a system according to claim 1 with the target body;
   upon a severing or disturbing of a separate and discrete optical sensing line by said hit or contact indicating event, passively detecting a signal at each said separate and discrete optical sensing line that is severed or disturbed;
   determining an energy of said passively detected signal; and
   determining a location of said hit or contact indicating event on said surface of said target body.

7. The method of claim 6, wherein said first set of separate and discrete optical sensing lines and said second set of separate and discrete optical sensing lines are wrapped in or on the target body in opposite rotational directions.

8. The method of claim 6, wherein the flexible grid of separate and discrete optical sensing lines comprises two or more layers and further comprising:
   estimating an impact velocity using a formula $d=v \times dt$, wherein d is a separation distance between two layers, v is impact velocity, and dt is a time difference between a signal received from each of the two layers.

9. The method of claim 6, further comprising least partially imbedding the separate and discrete optical sensing lines within a skin of the target body; mounting the separate and discrete optical sensing lines to an inner surface of a skin of the target; or attaching the separate and discrete optical sensing lines to structural members adjacent an inner surface of a skin of the target.

* * * * *